US006317728B1

(12) United States Patent
Kane

(10) Patent No.: US 6,317,728 B1
(45) Date of Patent: Nov. 13, 2001

(54) SECURITIES AND COMMODITIES TRADING SYSTEM

(76) Inventor: Richard L. Kane, 5030 Champion Blvd., Suite 6-183, Boca Raton, FL (US) 33496

( * ) Notice: Subject to any disclaimer, the term of this patent is extended or adjusted under 35 U.S.C. 154(b) by 0 days.

(21) Appl. No.: 09/170,745

(22) Filed: Oct. 13, 1998

(51) Int. Cl.[7] ................................................ G06F 17/60
(52) U.S. Cl. .............................................. 705/37; 705/36
(58) Field of Search .................................. 705/35, 36, 37, 705/38, 39; 235/379, 380; 340/825.26

(56) References Cited

U.S. PATENT DOCUMENTS

| | | | |
|---|---|---|---|
| 4,674,044 | 6/1987 | Kalmus et al. | 705/37 |
| 5,101,353 | 3/1992 | Lupien et al. | 705/37 |
| 5,297,031 | 3/1994 | Gutterman et al. | 705/37 |
| 5,305,200 | 4/1994 | Hartheimer et al. | 705/37 |
| 5,375,055 | 12/1994 | Togher et al. | 705/37 |
| 5,497,317 | 3/1996 | Hawkins et al. | 705/37 |
| 5,563,783 * | 10/1996 | Stolfo et al. | 705/8 |
| 5,671,363 | 9/1997 | Cristofich et al. | 705/37 |
| 5,845,266 * | 12/1998 | Lupien et al. | 705/37 |
| 5,873,071 * | 2/1999 | Ferstenberg et al. | 705/37 |
| 6,012,042 * | 1/2000 | Black et al. | 705/36 |
| 6,018,722 * | 1/2000 | Ray et al. | 705/36 |

FOREIGN PATENT DOCUMENTS

000790568A1 * 8/1997 (EP) .
410011510A * 1/1998 (JP) .
WO009641293A1 12/1996 (WO) .

OTHER PUBLICATIONS

Waters Information Services, Inc. "Citibank Tests FX AI System Compatible With F/X Trader?"FX Week, v1, n33, pN/A, Feb. 1991.*

Schmerken, Ivy, "Experts from the Promised Land to Wall Street", Wall Street & Technology, v11, n13, p22(3), May 1994.*

Omnitrader, "Investment analysis software 1996 Guide Computerized Trading Evaluation", Future v25, n8, p37(1), Feb. 1991.*

English D, How to choose and use investment software. (Compute's Getting Started with Personal money Mangement) (Buyers Guide), Compute, v15, n4, pS12 (4), Apr. 1993.*

Gilliland S, "Take stock of your finances: investment software", Computer Shopper, v14, n3, p512 (6), Mar. 1994.*

* cited by examiner

*Primary Examiner*—Vincent Millin
*Assistant Examiner*—Hani M. Kazimi
(74) *Attorney, Agent, or Firm*—Oltman, Flynn & Kubler

(57) ABSTRACT

In accordance with the invention there is provided a securities trading system based on the principles of artificial intelligence. It includes a data acquisition system having an input communicating with a securities exchange for receiving securities buy/sell data; a clock for generating clock times; a processing logic having inputs respectively communicating with the data acquisition system and with the clock for assigning respective clock times to said buy/sell data; a decision logic having a repository for storing a set of buy/sell rules for buying and selling securities in response to the buy and sell data aligned with the clock times; and a buy and sell execution system having an input communicating with the decision logic for executing buy and sell orders in conformance with the buy/sell rules. In the securities trading system according to the invention, the decision logic includes at least one decision agent, the agent representing a respective buy/sell rule, wherein further the decision logic may include at least two decision agents, each decision agent representing a respective buy rule or a respective sell rule. Artificial intelligence is provided in that the decision agents are rewarded in a feed-back arrangement by being given added or reduced voting power when their recommendations are found to respectively result in successful or unsuccessful decisions. Thereby a self-learning feature is provided which results in improving the performance of the system as the number of transactions increase.

9 Claims, 23 Drawing Sheets

BACKGROUND AND SUMMARY OF THE INVENTION

Wealth Wizard ® Process Overview

Figure 1 presents an overview of the Wealth Wizard process.

Figure 18

First day with updated agents

| Time | Order # | Trans | Shares | Symbol | Price | | Term | Credit |
|---|---|---|---|---|---|---|---|---|
| 10:11:34 | RGJ0001 | Sold Short | 1000 | MRK | 117 | 1/4 | Day | $117,250.00 |
| 11:25:42 | RGJ0002 | Bought | 1000 | MRK | 117 | 1/8 | Day | |
| 11:33:19 | RGJ0003 | Sold Short | 1000 | PEP | 38 | 3/4 | Day | $38,750.00 |
| 12:19:11 | RGJ0004 | Sold Short | 1000 | WMT | 54 | 9/16 | Day | $54,562.50 |
| 12:25:06 | RGJ0005 | Bought | 1000 | BA | 48 | 5/8 | Day | |
| 13:14:02 | RGJ0006 | Bought | 1000 | PEP | 38 | 13/16 | Day | |
| 13:32:56 | RGJ0007 | Bought | 1000 | WMT | 54 | 9/16 | Day | |
| 13:39:28 | RGJ0008 | Sold | 1000 | BA | 48 | 3/8 | Day | $48,375.00 |
| 13:45:57 | RGJ0009 | Bought | 1000 | BA | 48 | 3/8 | Day | |
| 13:53:25 | RGJ0010 | Sold Short | 1000 | WMT | 54 | 9/16 | Day | $54,562.50 |
| 14:45:06 | RGJ0011 | Sold Short | 1000 | KO | 77 | 5/16 | Day | $77,312.50 |
| 14:59:47 | RGJ0012 | Sold | 1000 | BA | 48 | 1/4 | Day | $48,250.00 |
| 15:04:48 | RGJ0013 | Bought | 1000 | BA | 48 | 1/4 | Day | |
| 15:17:28 | RGJ0014 | Bought | 1000 | KO | 77 | 1/4 | Day | |
| 15:19:04 | RGJ0015 | Bought | 1000 | WMT | 54 | 1/8 | Day | |
| 15:23:18 | RGJ0016 | Bought | 1000 | AOL | 82 | 1/8 | Day | |
| 15:37:17 | RGJ0017 | Sold Short | 1000 | WMT | 54 | 3/16 | Day | $54,187.50 |
| 15:47:09 | RGJ0018 | Bought | 1000 | WMT | 54 | 1/4 | Day | |
| 15:50:11 | RGJ0019 | Sold | 1000 | AOL | 82 | 9/16 | Day | $82,562.50 |
| 15:54:02 | RGJ0020 | Sold | 1000 | BA | 48 | 1/2 | Day | $48,500.00 |
| | Shares | | 20000 | | | | | $624,312.50 |
| | | | | | | | | $812.50 |
| | | | | | | | | $400.00 |
| | | | | | | | | $21.23 |
| | | | | | | | | $412.50 |

Figure 22

SECURITIES AND COMMODITIES TRADING SYSTEM

The invention relates to a securities (the term "securities" is in the following to be understood to include "securities and/or commodities") and/or commodities trading system that includes a computer arrangement communicating with a securities exchange, and has inputs for receiving buy and sell data. The computer arrangement is capable of evaluating the buy/sell data and issuing buy/sell orders in accordance with a plurality of buy/sell rules, i.e. "agents," stored in the system. A feedback arrangement monitors the success and failure of the respective buy/sell agents and assigns rating powers, i.e. weightings, to the buy/sell agents in order to implement a learning process for gradually improving the system performance based on past and continuously accumulating experience of the agents.

BACKGROUND OF THE INVENTION

A program-trading software system is disclosed to be available to individual investors, small trading houses and investment managers. The trading system monitors a portfolio of securities in real time, executing trades automatically. The system is targeted to Intra-Day trading, a method of trading well suited to computer automation. The system performs a kind of careful, tireless monitoring, aimed to give the user a daily return on his/her investment, while minimizing risk.

The methods and formulas employed by the system were developed over a number of years of active trading, and take full advantage of 14 years of experience with pattern analysis and mathematical modeling.

The system may increase assets by leveraging daily fluctuations aiming to beat the financial market, the market-makers, institutional investors and the brokerage houses.

With the recent advent of deep discount electronic brokers, transaction fees have dropped to where active trading can be highly profitable. Large fund managers are limited by the size of the funds they manage, They cannot buy and sell large quantities of stock without impacting the price. On buying, the price goes up, and on selling it goes down.

SUMMARY OF THE INVENTION

The following is needed to practice the invention: software programs as disclosed herein; money to invest; an operating program such as Windows® 95 or NT, or the like; an internet connection; and a brokerage account.

Investing can be risky, since it is impossible to predict stock market fluctuations or company events with any accuracy. Frequently stocks plummet in overnight trading, leaving an individual investor unprotected during that time. In general, bad news is remembered longer than good news. A bad quarterly report from a company may take months to recover from, while an item of good news may be forgotten in days. Generally, stock prices fluctuate 1–3% each day, and by leveraging these fluctuations as outlined herein one may realize a return on investment. A combination of real time monitoring a portfolio of stocks and no holding positions overnight (trading flat) can shield an investor from loss while maximizing gain.

The invention embodies a process for trading securities that operates as follows: On a typical trading day a commodity or a stock may take a small dip at e.g. 9:35 am, reach its high at 11:30 am and decline until 3 pm. perhaps with a small run up at close of the day. The system buys, through a selected one of the agents, a stock or commodity at a morning dip and sells it at a mid-morning high. It then sells the stock or commodity short and buys to cover at a lower afternoon price. One makes money on the way up, and more on the way down. If possible, the system will end the day without holding any stock . . . but it if does, it will be short position. It is far more likely a stock will go down overnight than go up in value.

By monitoring one's stock holdings continuously during the day, and watching trends, the system will limit one's losses by dumping the stock should things go awry, while maximizing profits by riding out the trends. If one holds a long position overnight, one may have uncontrolled risk.

If the market is over-valued and headed for a correction, can one safely invest in this climate? The answer is yes! The system can help limit the risks.

The system provides an extract file of trades, compatible with popular tax programs, to help prepare tax returns. This reporting can save time at tax time.

Since it is difficult to watch and monitor a stock ticker during the day, a lapse in attention can be costly. Getting caught up emotionally may keep one from making good decisions. The system does not get tired, does not panic and does not get greedy, but always operates under the rules embedded in the agents.

More importantly, brokerage firms do not let one place sell and stop orders on the same shares. That is to say, one can either try to protect oneself with stop loss orders, or one can try to profit with sell orders, but one cannot do both. The system effectively lets one do both by monitoring stocks continuously.

The system enables a person to make money while on vacation. It does the drudge work of monitoring the market. It may be arranged to send alphanumeric trade reports to a user by cellular phone or pager.

Use of margin can increase one's earning power. With margin the system may deliver a return each month. But margin costs money. It is a loan against one's current stock holdings, allowing one to buy more stock. If one holds the stock for days, weeks or months, one pays margin interest even if the stock price loses ground. By actively trading, one incurs a fraction of the margin costs, and may not incur any at all, since one is borrowing and returning the same day.

The system will also let one hold stocks with pre-set buy, sell and dump prices, allowing one to automate transactions, get pager notifications and view continuously updated prices while supporting existing strategies.

In accordance with the invention there is provided a securities trading system having a data acquisition system having an input communicating with a securities exchange for receiving securities buy/sell data; a clock for generating clock times; a processing logic having inputs respectively communicating with the data acquisition system and with the clock for assigning respective clock times to said buy/sell data; a decision logic having a repository for storing a set of buy/sell rules for buying and selling securities in response to the buy and sell data aligned with the clock times; and a buy and sell execution system having an input communicating with the decision logic for executing buy and sell orders in conformance with the buy/sell rules.

In the securities trading system according to the invention, the decision logic includes at least one decision agent, the agent representing a respective buy/sell rule, wherein further the decision logic may include at least two decision agents, each decision agent representing a respective buy rule or a respective sell rule.

According to a further feature, the securities trading system provides that the sell rule is a short sell rule and the buy rule is a long buy rule, and the decision logic includes at least one agent being responsive to one of the buy/sell rules, that agent being operative for generating a buy/sell order in response to the buy/sell data conforming to the buy/sell rule.

The securities trading system according to the invention may further include a plurality of agents, each agent operating in response to a dedicated one of the buy/sell rules, and wherein each of the agents has a respective input for commonly receiving the buy/sell data.

The securities trading system may further include a feedback connection from the current assets memory to each of the agents for conveying a cumulative number of merit points to a respective agent having issued a sell order for a successful trade.

The invention further includes a method for trading securities with a securities exchange, the method including a data acquisition system having an input communicating with at least one securities exchange for receiving buy/sell data; a clock for generating clock times; a processing logic having inputs respectively communicating with the data acquisition system and with the clock for assigning respective clock times to the buy/sell data; a decision logic including a repository for storing a plurality of buy/sell rules for buying and selling securities in response to the buy/sell data; the decision logic having a plurality of agents, each operating in response to a respective buy/sell rule for generating buy/sell orders for securities in conformance with the buy/sell data; the agents having outputs communicating with the securities exchange for executing the buy/sell orders; wherein the method includes the steps:

(a) issuing to all agents a tentative buy short/sell long order for a given security;
(b) soliciting from all agents a tentative buy short decision for the given security;
(c) affirming with the decision logic the buy short decision if a majority of the agents have indicated an affirmative buy short decision; and
(d) executing with an executing logic the affirmed buy short order.

The method may further provide the features of:
(a) monitoring for a given length of time the security bought on the buy short order; and
(b) when the security has accrued value sufficiently to at least cover the short buy plus a given profit, issuing a buy long order for the security.

The method may further include setting the given length of time to end before the trading day of the buy short order, and/or monitoring for another given length of time with the decision logic the rates of success and failure of each agent and feeding back to each agent a cumulative merit quotient increment according to the cumulative rate of success and/or failure for the respective agent.

Further objects and advantages of this invention will be apparent from the following detailed description of a presently preferred embodiment, shown schematically in the accompanying drawings.

BRIEF DESCRIPTION OF THE FIGURES

FIG. 18 is a printout of sample forms/executions, showing a trade for 900 shares short of e.g. stock TRV, wherein the trade record shows a sample trade;

FIG. 22 shows a trading pattern of the system on an average trading day.

Before explaining the disclosed embodiment of the present invention in detail it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENT

Figure 1:
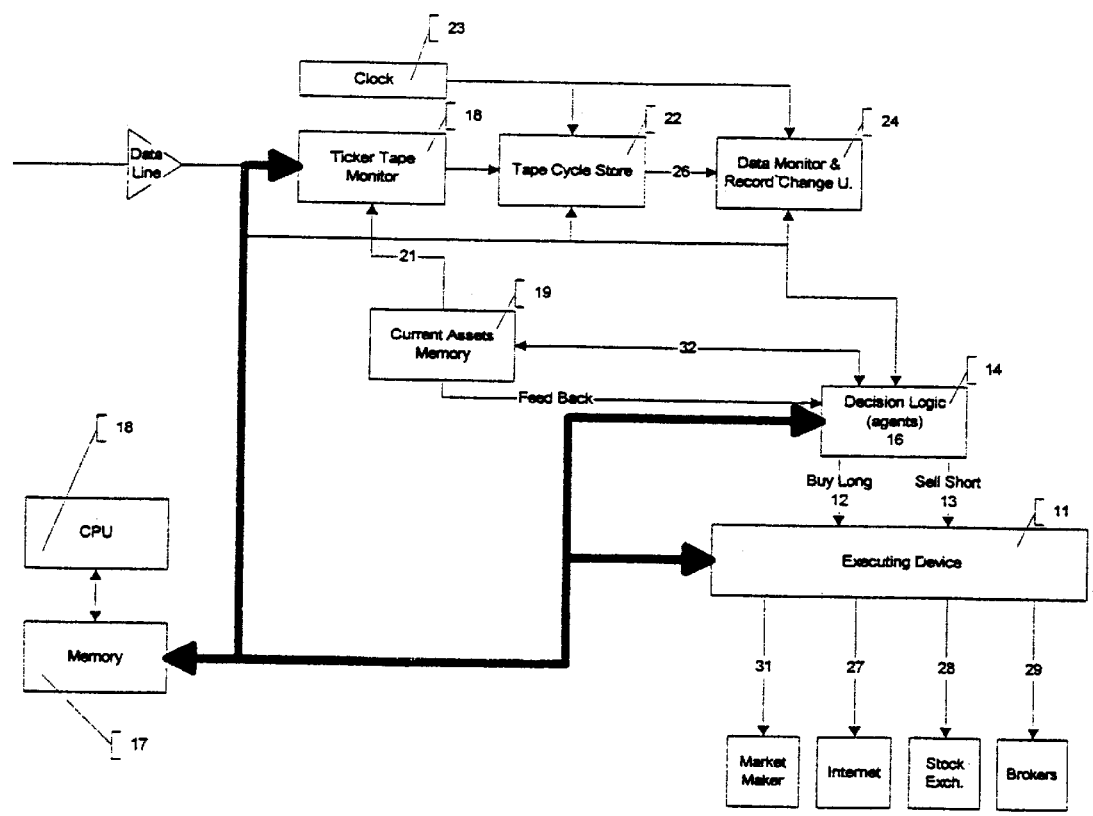
FIG. 1 is a block diagram of the major components of the invention, showing hardware and software components and their mutual lines of interaction.

FIG. 1 is a block diagram of the major components of the invention, showing hardware and software components and their mutual lines of interaction; wherein an executing device 11 is connected via respective "buy long" and "sell short" data channels 12,13 to a decision logic 14 composed of a plurality of "agents" 16.

Each agent exists as a module or section of computer logic, physically stored in a computer memory 17, which is connected with and controlled by a central processing unit CPU 18 in conventional manner. Each agent 16 performs a respective buy or sell decision based on buy and sell rules embedded in each agent. All agents represent different buy and sell rules, and all receive continuously the movements of the securities market(s) in general as received from the conventional ticker tape data as continuously being issued as a data stream from the various securities and/or commodities markets, being received on a data line 17 connected via conventional data transmission facilities from securities and/or commodities markets.

The ticker-tape data as they arrive in continuous streams of data are extracted by the ticker-tape monitor 18 which retains only data that pertain to specific securities and/or commodities stored in the system's Current Assets Memory 19, connected via data line 21 to the ticker-tape monitor 18. All pertinent ticker-tape data are stored in an organized order in the Tape Cycle Store 22, and periodically examined under control of a Clock 23.

A Data Monitor and Record Change Unit 24 keeps a running record of all periodically recorded data from the Tape Cycle Store via data line 26, and processes the data in accordance with a certain set of general rules pertaining to all securities and for commodities in inventory such as, for example, running averages for certain selected time periods, certain selected trends, such as price trends that are rising and falling in accordance with preset criteria, and so forth.

All such selected prices, trends and moves of securities and commodities prices are maintained and kept updated in the data monitor and record change unit 24. The decision logic 14 is composed of a plurality of e.g. 160 intelligent agents, divided into, e.g. 80 long agents and 80 short agents, which may collectively issue "buy/sell" suggestions for securities transactions as they may pertain to one security transaction at a time. The decision as to the acquisition and/or disposal of positions in the securities and/or commodities is made by each agent according to the rules embedded in each agent. Generally, all agents make a recommendation as to the disposition of a respective security and/or commodity and a vote is taken of all decisions of the respective agents by a voting algorithm contained e.g. in the decision logic 16. The result of the vote is transmitted via one of the "buy long" data channel 12 or the "sell short" data channel 13, and the decision is executed in the executing device 11, which transmits the corresponding order via an appropriate data channel, such as an internet data connection 27, stock exchange data connection 28, or a data channel 29 to a broker. A special data connection 31 may be provided to a so-called "super broker" who handles several types of trades.

As a result of the execution of each trade, corresponding adjustment in value takes place for a respective security or commodity in the current assets memory 19. The adjustment may be positive as a result of a successful transaction or negative for an unsuccessful transaction. Each adjustment is fed back from the current assets memory 19 as a score via data channel 32 to be accumulated in each agent in a merit memory dedicated to each respective agent. In each agent, its voting power is weighted by the accumulated score. As a result, agents accumulating higher scores attain over time increased "voting power" so that agents providing better decisions gain increased influence on the overall system's performance. In other words, the system undergoes a "learning process."

Figure 2:
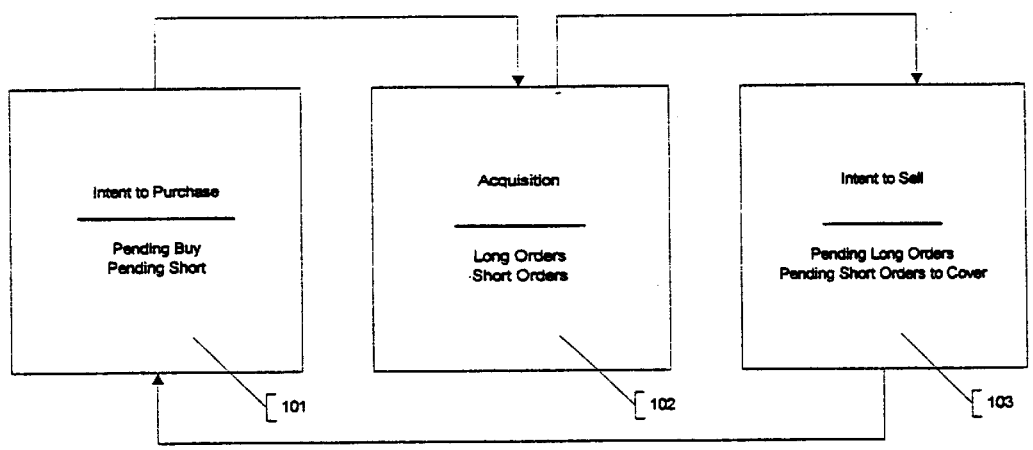
FIG. 2 is a simplified flow chart showing the major steps performed in practicing the invention.
Figure 3:
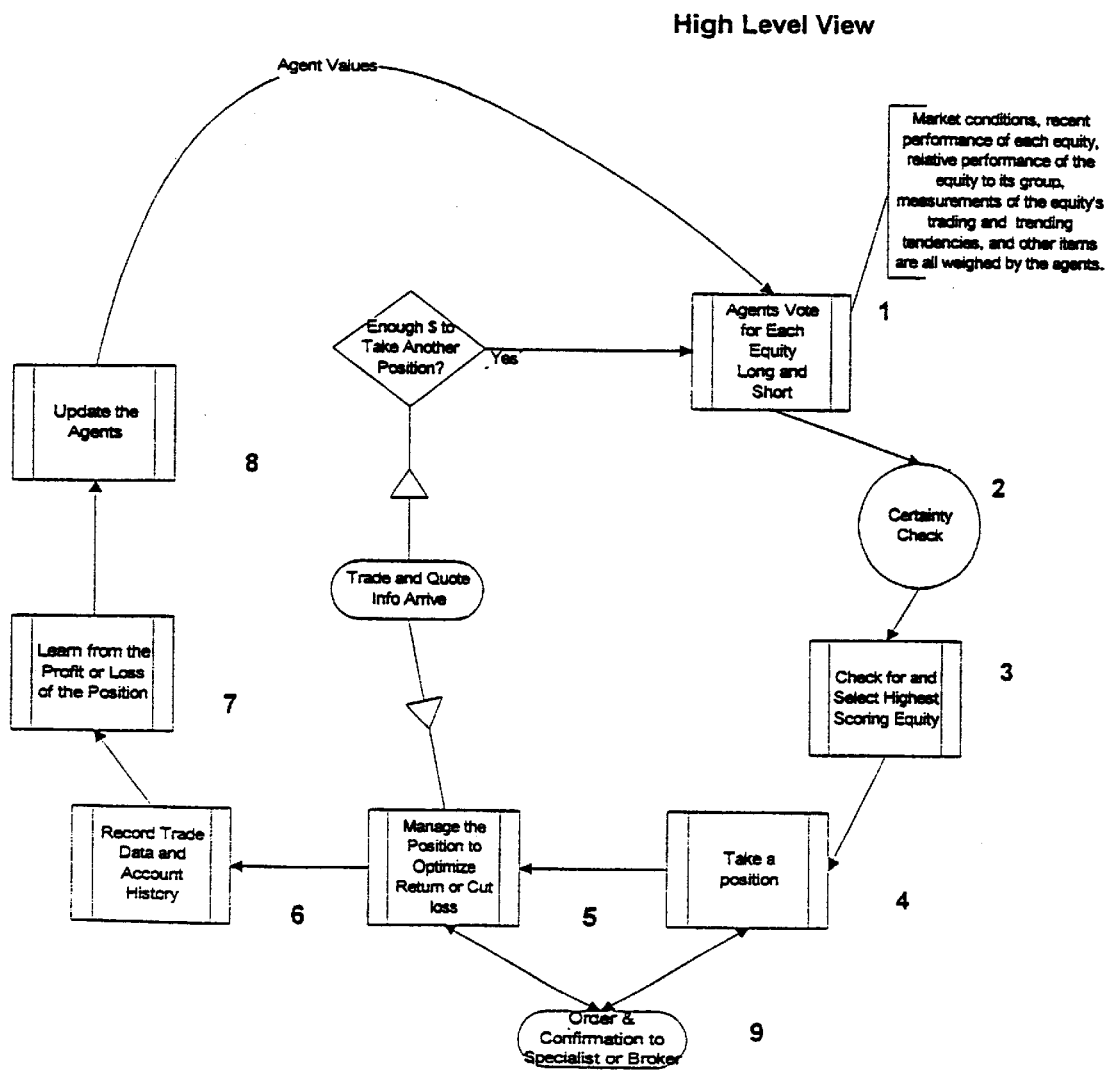
FIG. 3 is a high level view of the flow of information and the major steps of a typical transaction.
Figure 4:
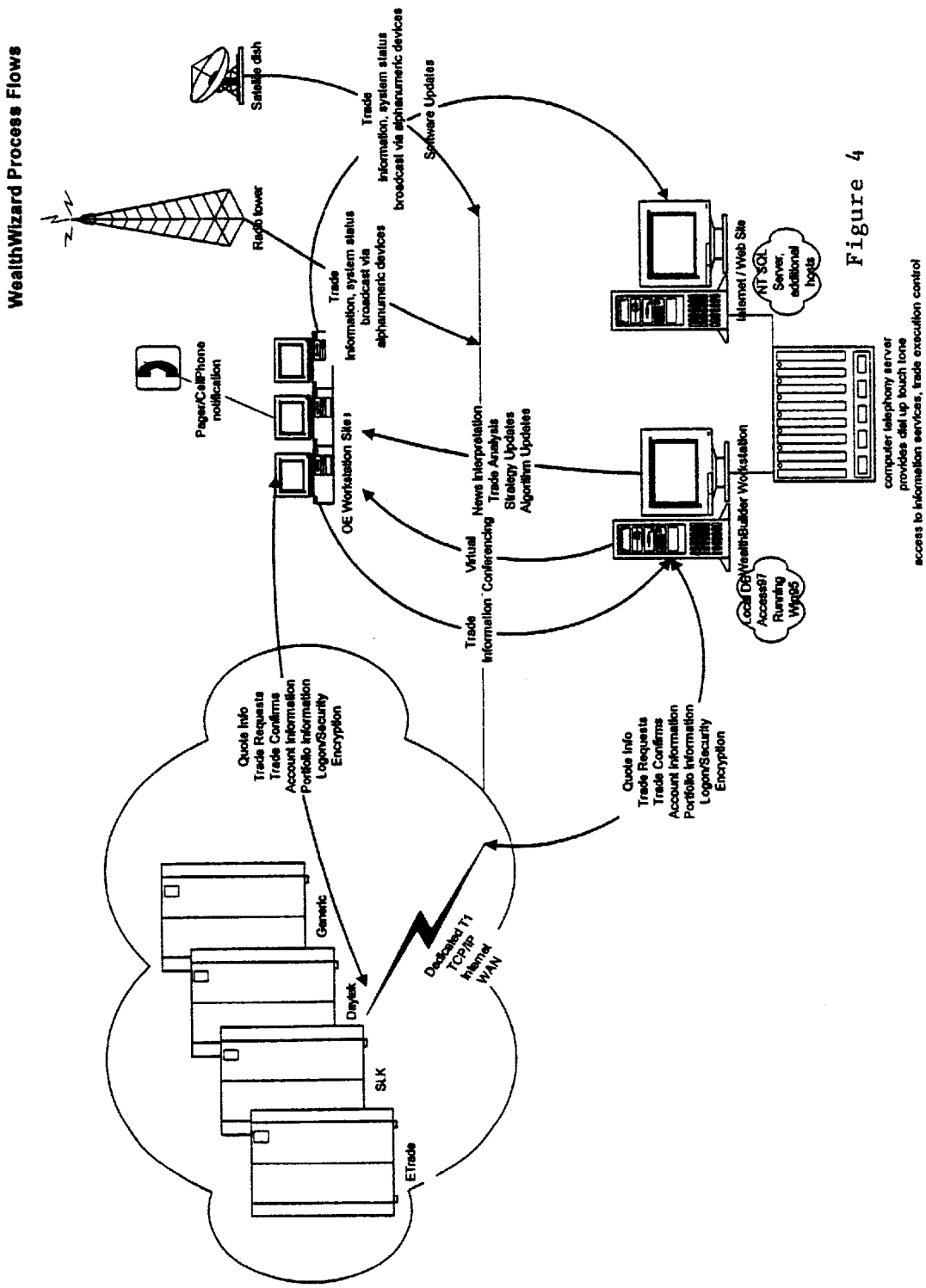
FIG. 4 is a block diagram of a typical embodiment of the invention showing its major function blocks and the process information flow between the blocks.
Figure 5:
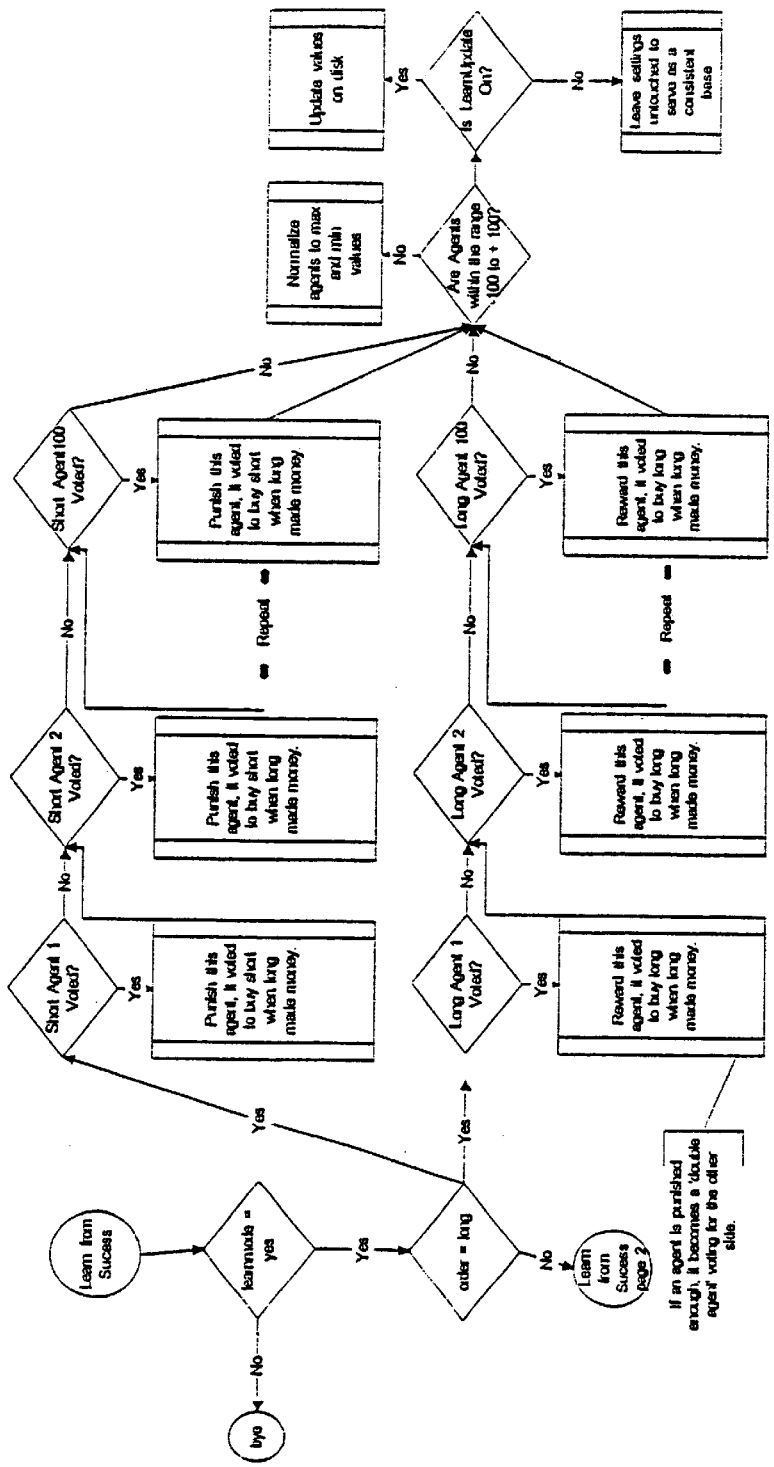
FIG. 5 is a flow chart showing the major function blocks and the information and decision steps in performing a learning process for a successful long order transaction.
Figure 6:
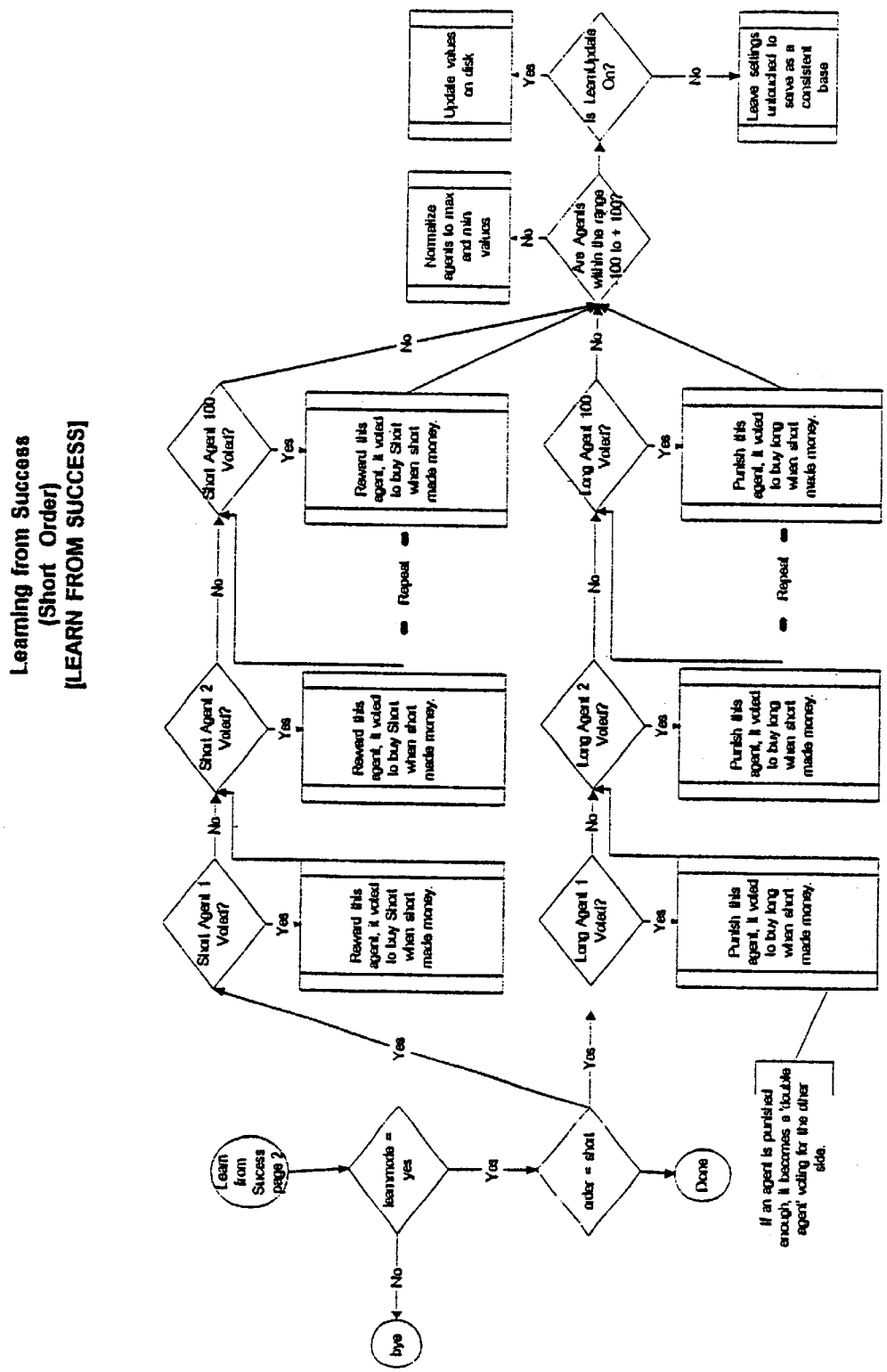
FIG. 6 is a flow chart showing the major function blocks of a learning from success process as in FIG. 5, for a short order transaction.
Figure 7:
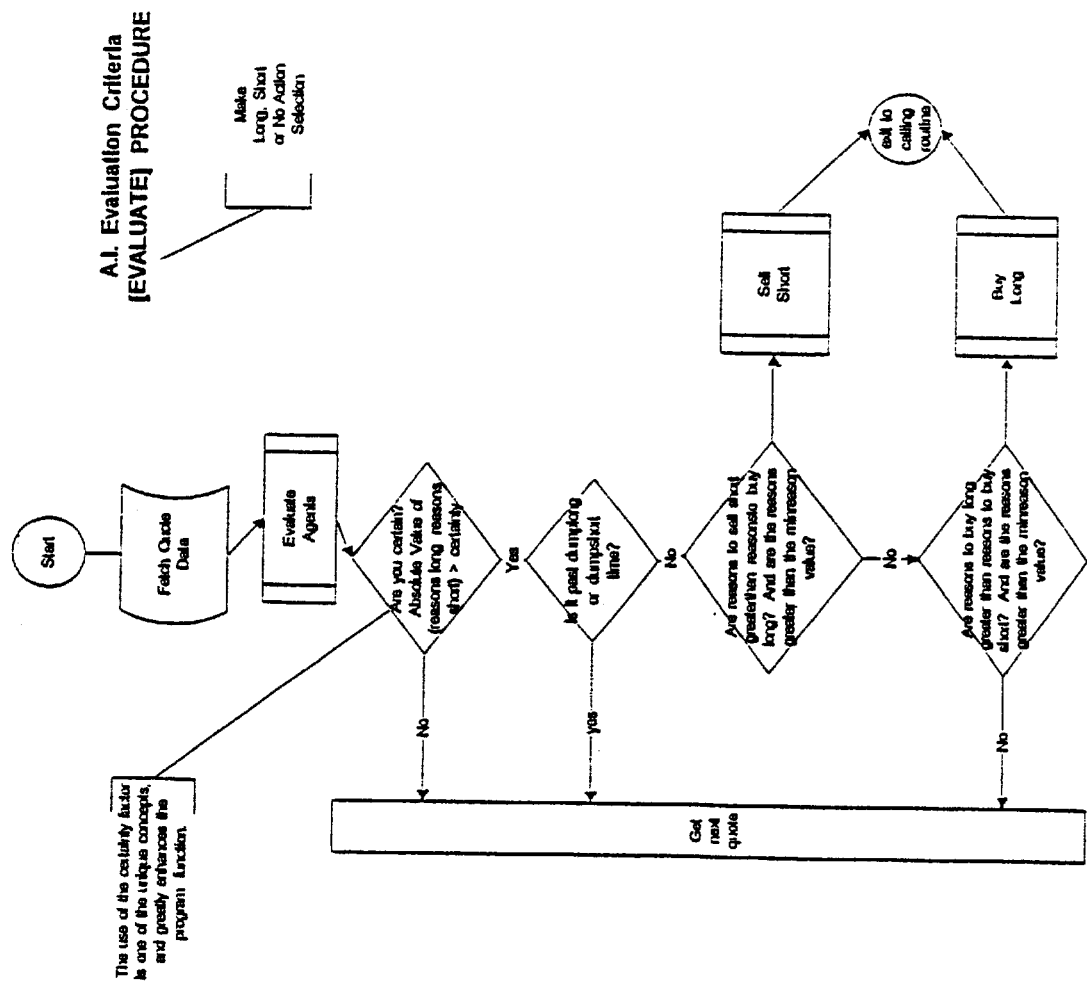
FIG. 7 is a flow chart for an evaluation procedure showing the major steps of the evaluation procedure with artificial intelligence and evaluation criteria.
Figure 8:
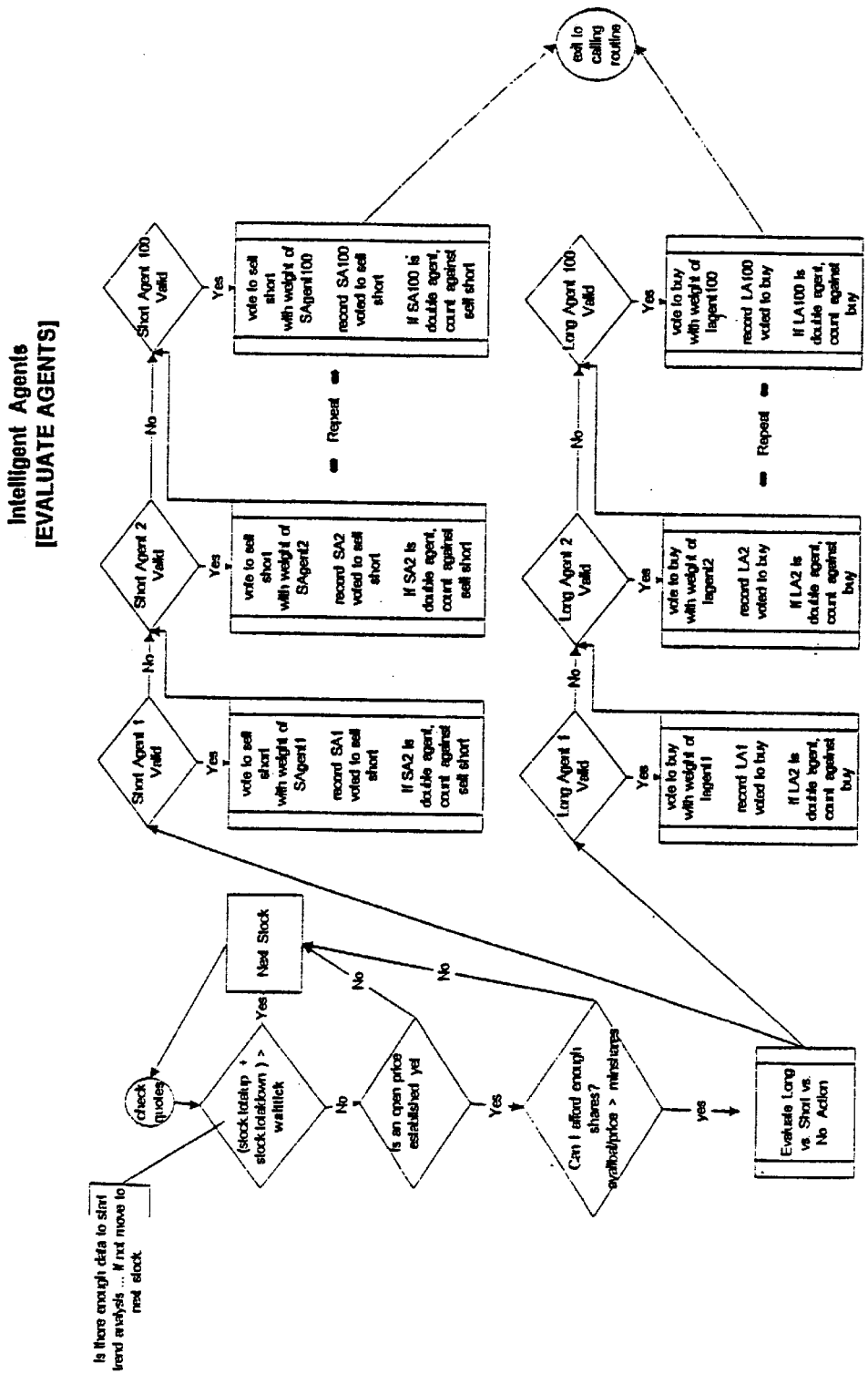
FIG. 8 is a flow chart showing the major steps in an evaluating procedure for evaluating the agents.
Figure 9:
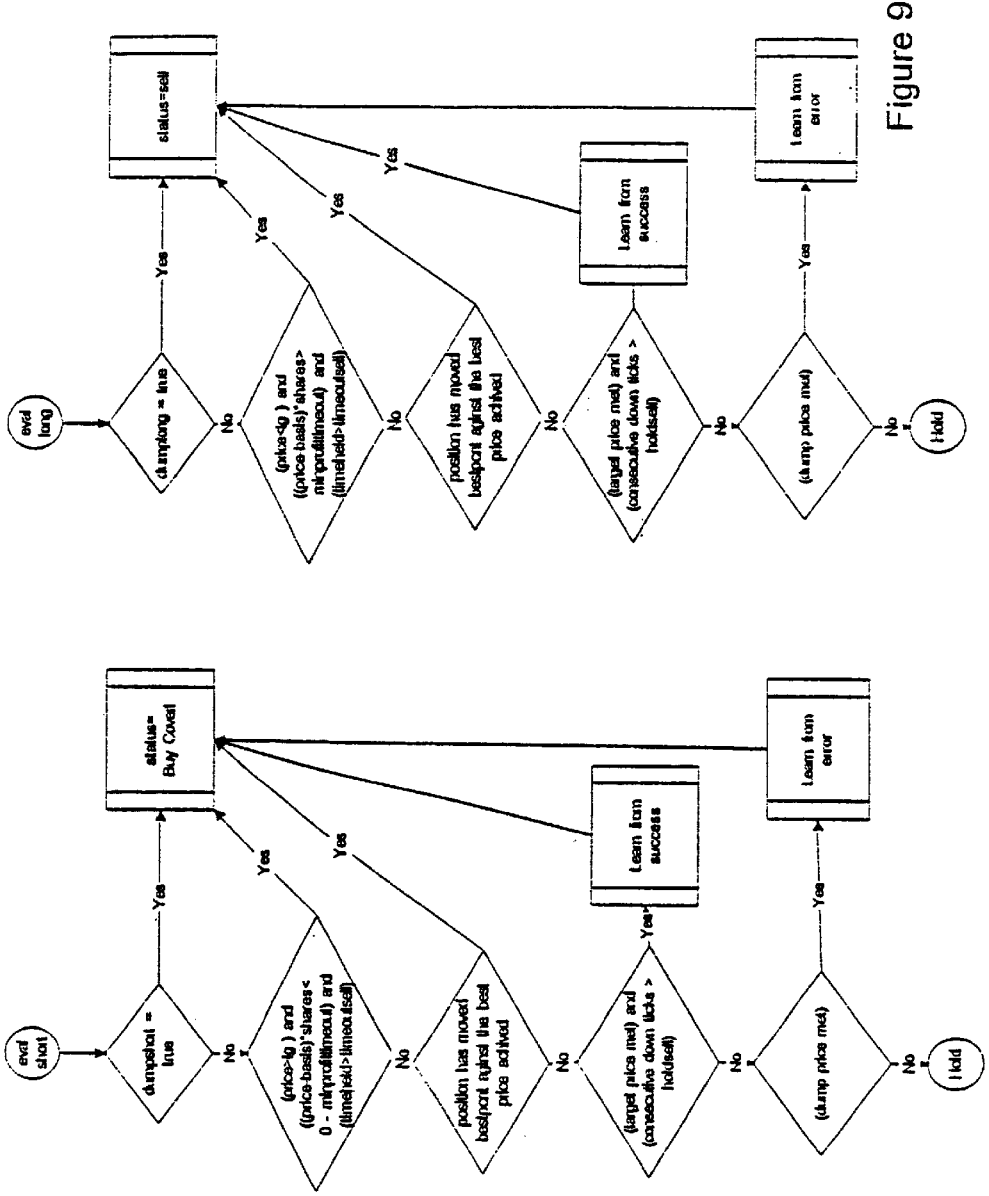
FIG. 9 is a flow chart showing the major steps in determining hold/sell decisions.
Figure 10:
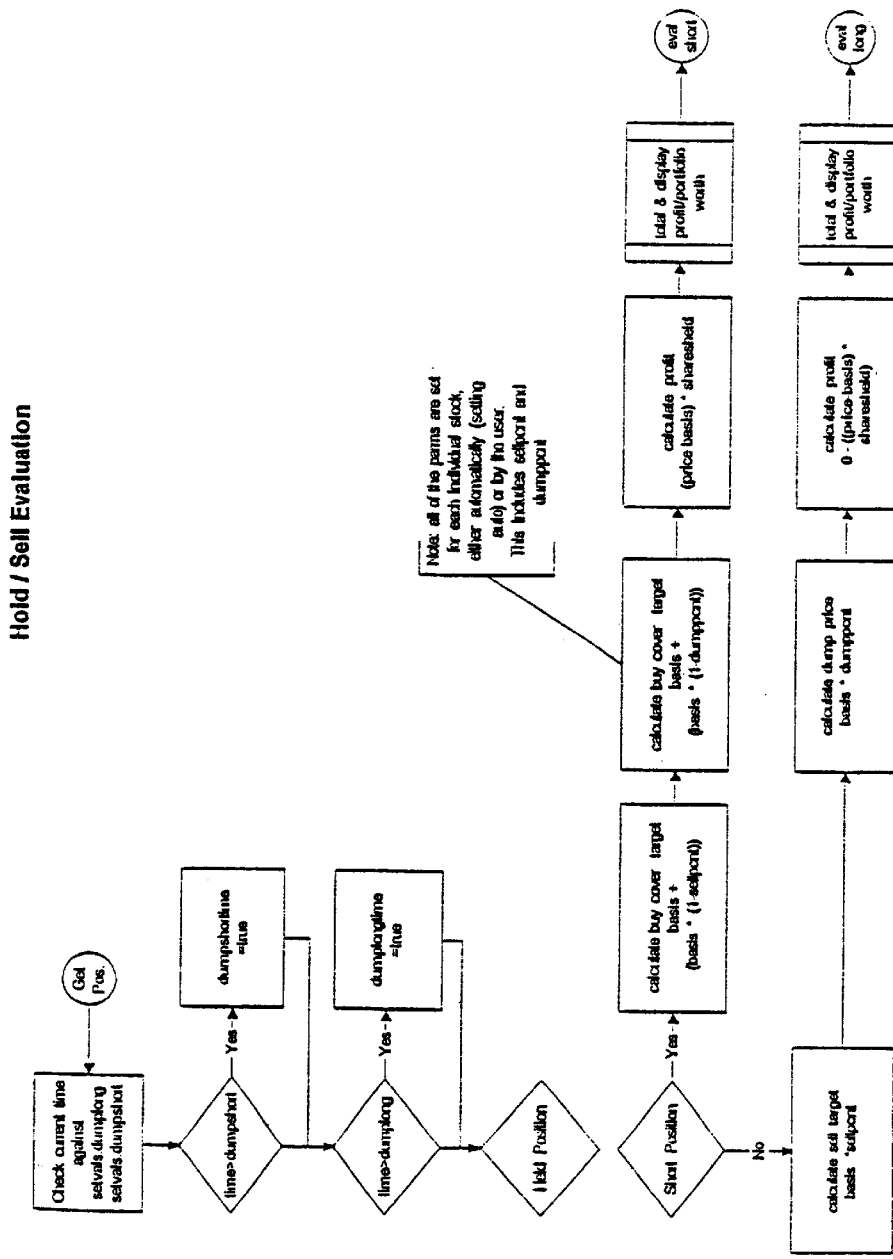
FIG. 10 is a flow chart showing the major steps in performing a hold/sell evaluation procedure.
Figure 11:
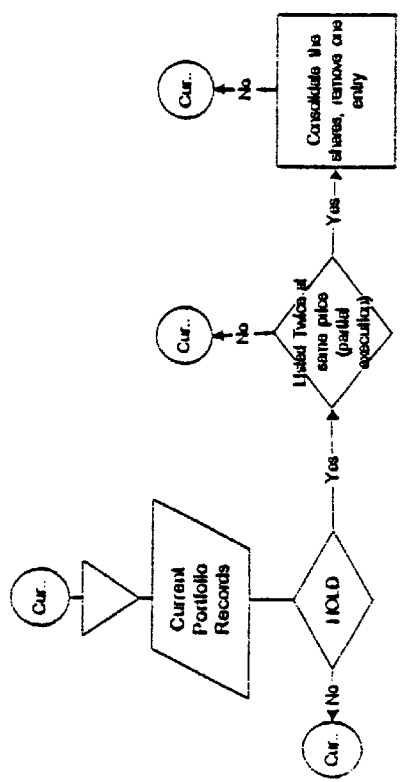
FIG. 11 is a flow chart showing the major steps of portfolio capture, including handling of partial orders.
Figure 12A:
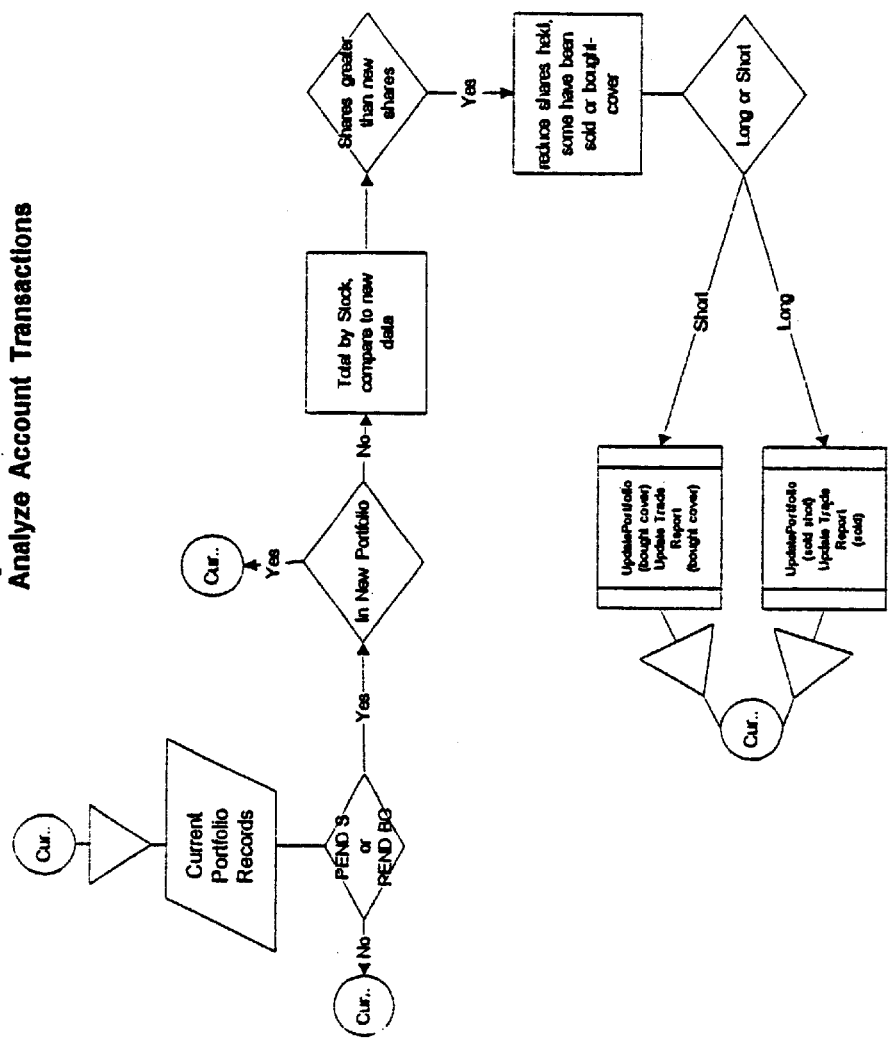
FIG. 12a is a flow chart showing the major steps in processing buy/sell-short data from the portfolio, including analysis of account transactions.
Figure 12B:
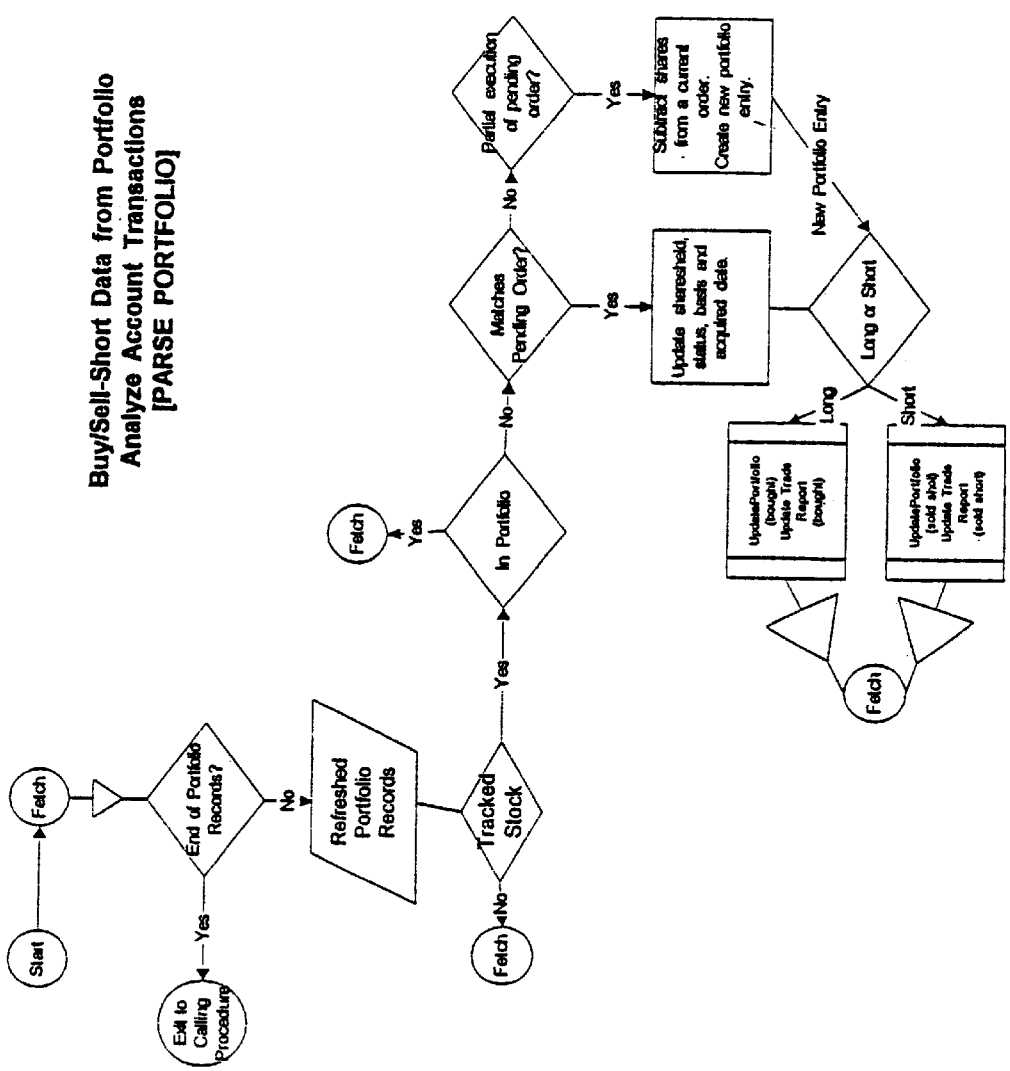
FIG. 12b is a flow chart showing the major steps in analyzing buy/sell-short data from the portfolio, including analysis of account transaction, and parsing of the portfolio.
Figure 13:
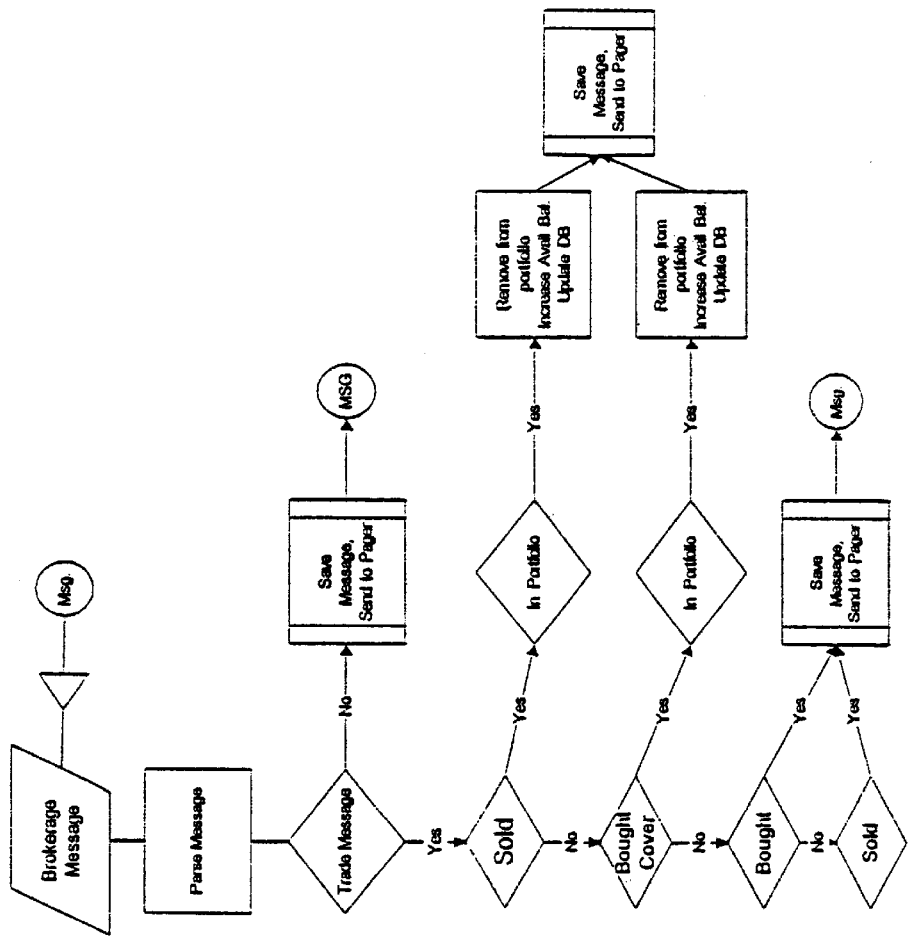
FIG. 13 is a flow chart showing the major steps in parsing a trade message from a broker, including getting a message relating to sell/buy-to-cover.
Figure 14:
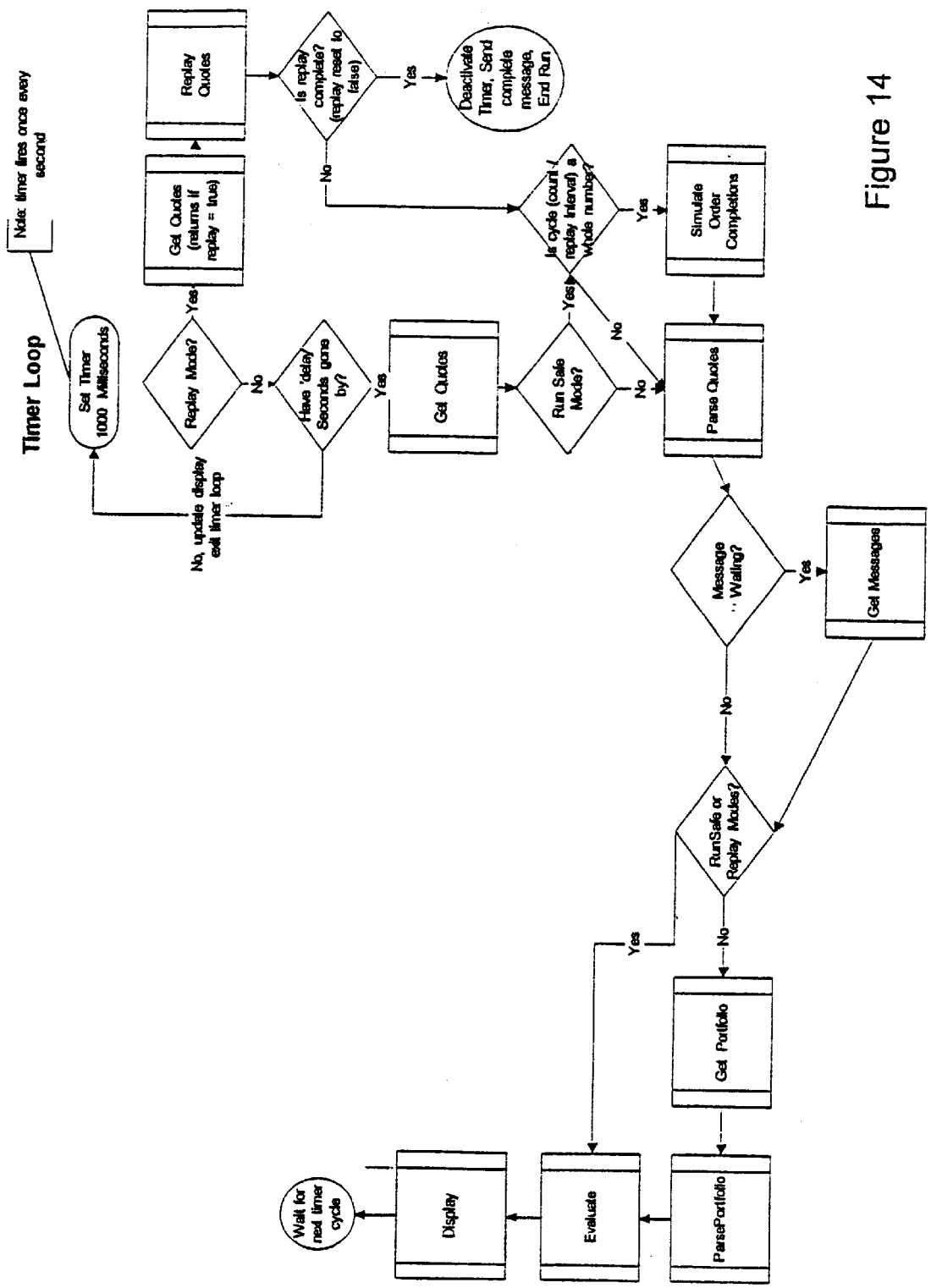
FIG. 14 is a flow chart showing the major steps in the timing loop for a typical transaction.
Figure 15:
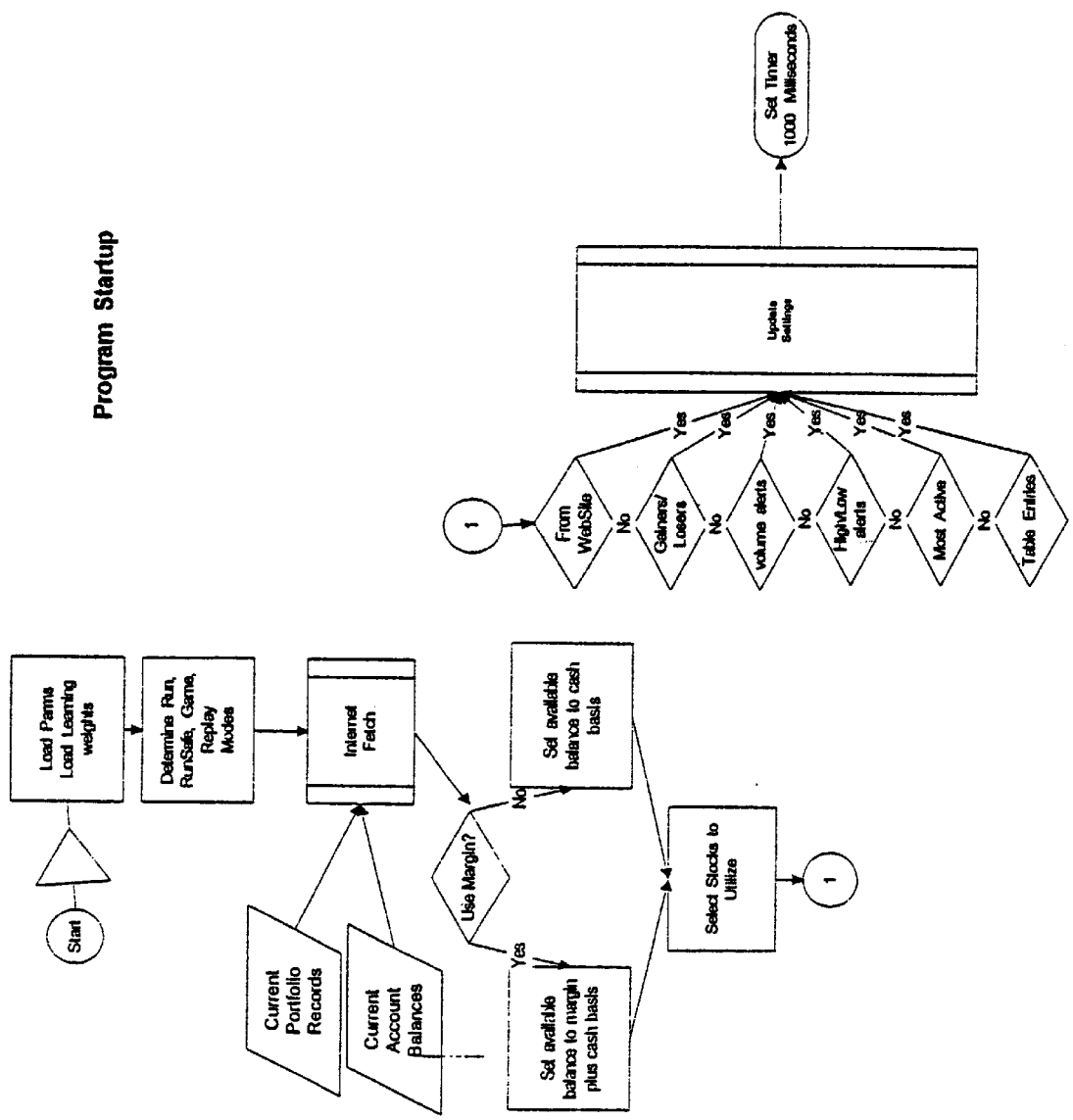
FIG. 15 is a flow chart showing the major steps of a program startup procedure, and the major decision steps of the procedure.
Figure 16:
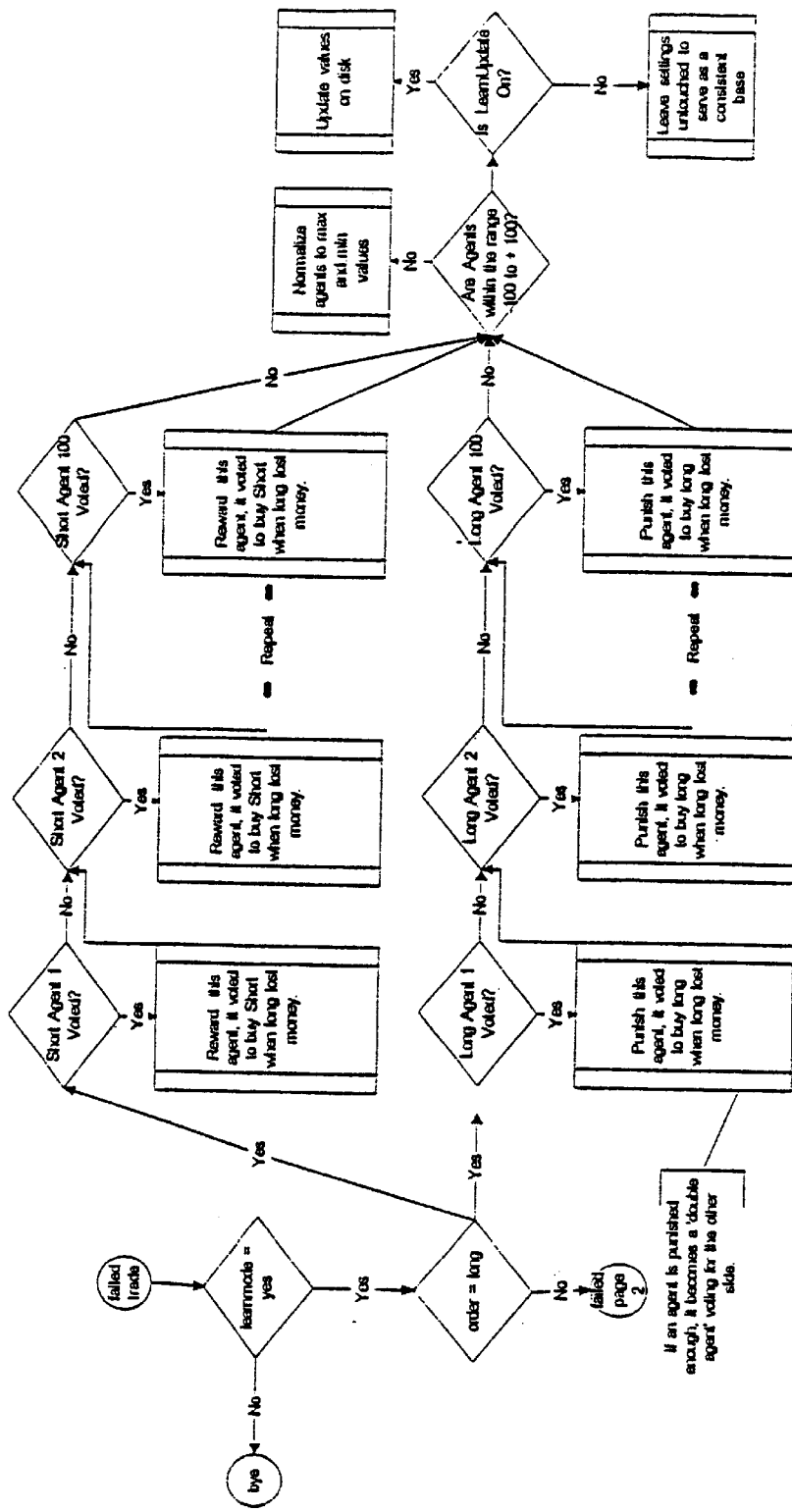
FIG. 16 is a flow chart showing the major steps in learning from a failure process related to long order flow.
Figure 17:
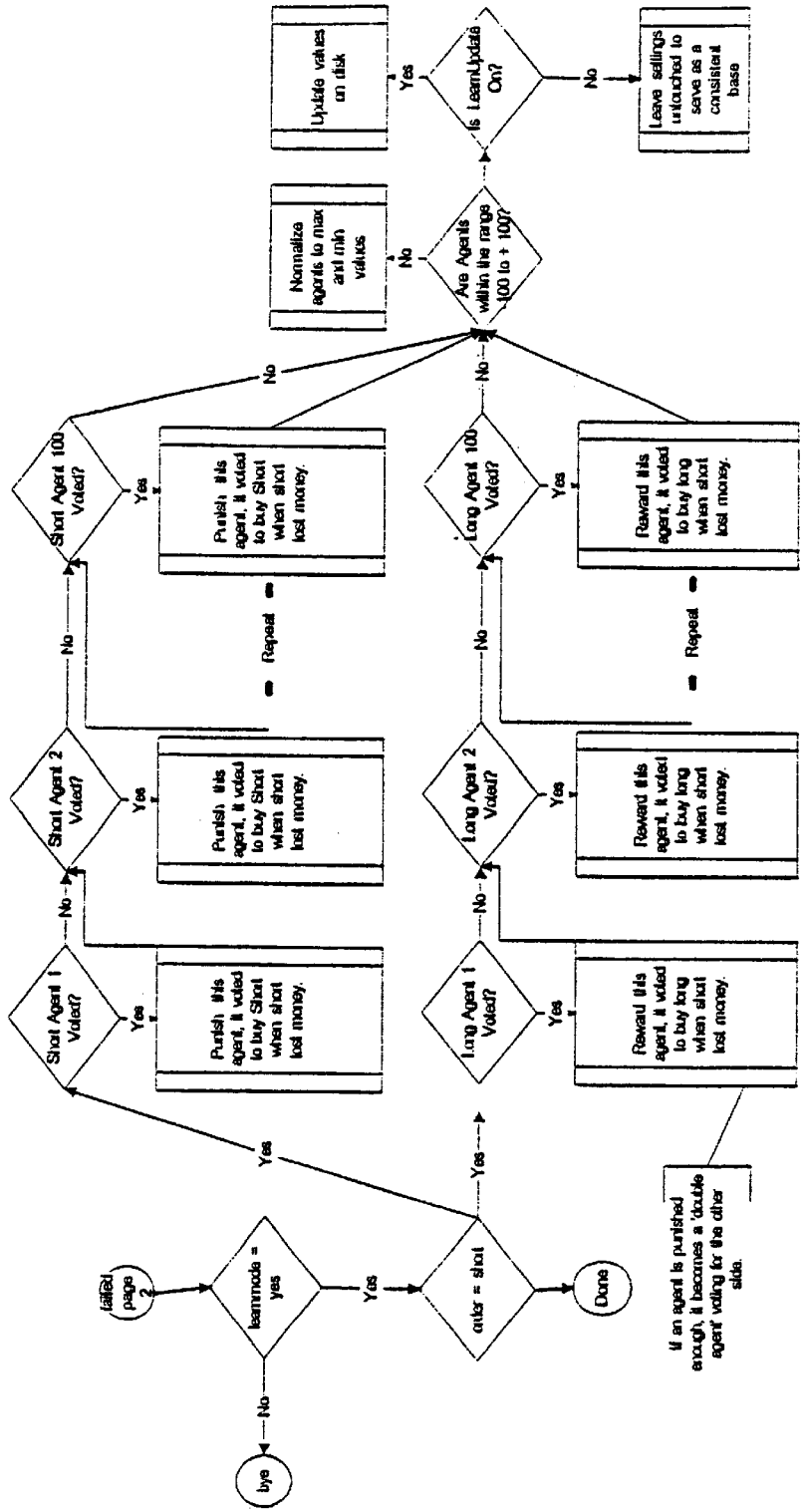
FIG. 17 is a flow chart showing the major steps in learning from a failure process related to short order flow.

FIG. 2 is a simplified flow chart showing three major steps performed in practicing the invention, beginning with an "Intent to Purchase" 101, representing a pending buy or pending short transaction, which is followed by an "Acquisition" 102, which is in turn followed by an "Intent to Sell" 103, followed again by "Intent to Purchase" 101, and so forth;

FIG. 3 is a high level view of the flow of information and the major steps of a typical transaction;

FIG. 4 is a block diagram of a typical embodiment of the invention showing its major function blocks and the process information flow between the blocks;

FIG. 5 is a flow chart showing the major function blocks and the information and decision steps in performing a learning process for a successful long order transaction;

FIG. 6 is a flow chart showing the major function blocks of a learning from success as in FIG. 5, for a short order transaction;

FIG. 7 is a flow chart for an evaluation procedure showing the major steps of the evaluation procedure with artificial intelligence and evaluation criteria;

FIG. 8 is a flow chart showing the major steps in an evaluating procedure for evaluating the agents;

FIG. 9 is a flow chart showing the major steps in determining hold/sell decisions;

FIG. 10 is a flow chart showing the major steps in performing a hold/sell procedure;

FIG. 11 is a flow chart showing the major steps of portfolio capture, including handling of partial orders;

FIG. 12a is a flow chart showing the major steps in processing buy/sell-short data from the portfolio, including analysis of account transactions;

FIG. 12b is a flow chart showing the major steps in analyzing buy/sell-short data from the portfolio, including analysis of account transaction, and parsing of the portfolio;

FIG. 13 is a flow chart showing the major steps in parsing a trade message from a broker, including getting a message relating to sell/buy-to-cover;

FIG. 14 is a flow chart showing the major steps in the timing loop for a typical transaction;

FIG. 15 is a flow chart showing the major steps of a program startup procedure, and, and the major decision steps of the procedure;

FIG. 16 is a flow chart showing the major steps in learning from failure process related to long order flow;

FIG. 17 is a flow chart showing the major steps in learning from failure process related to short order flow;

In FIG. 18, this trade record shows a sample trade on the system.

Figure 18:
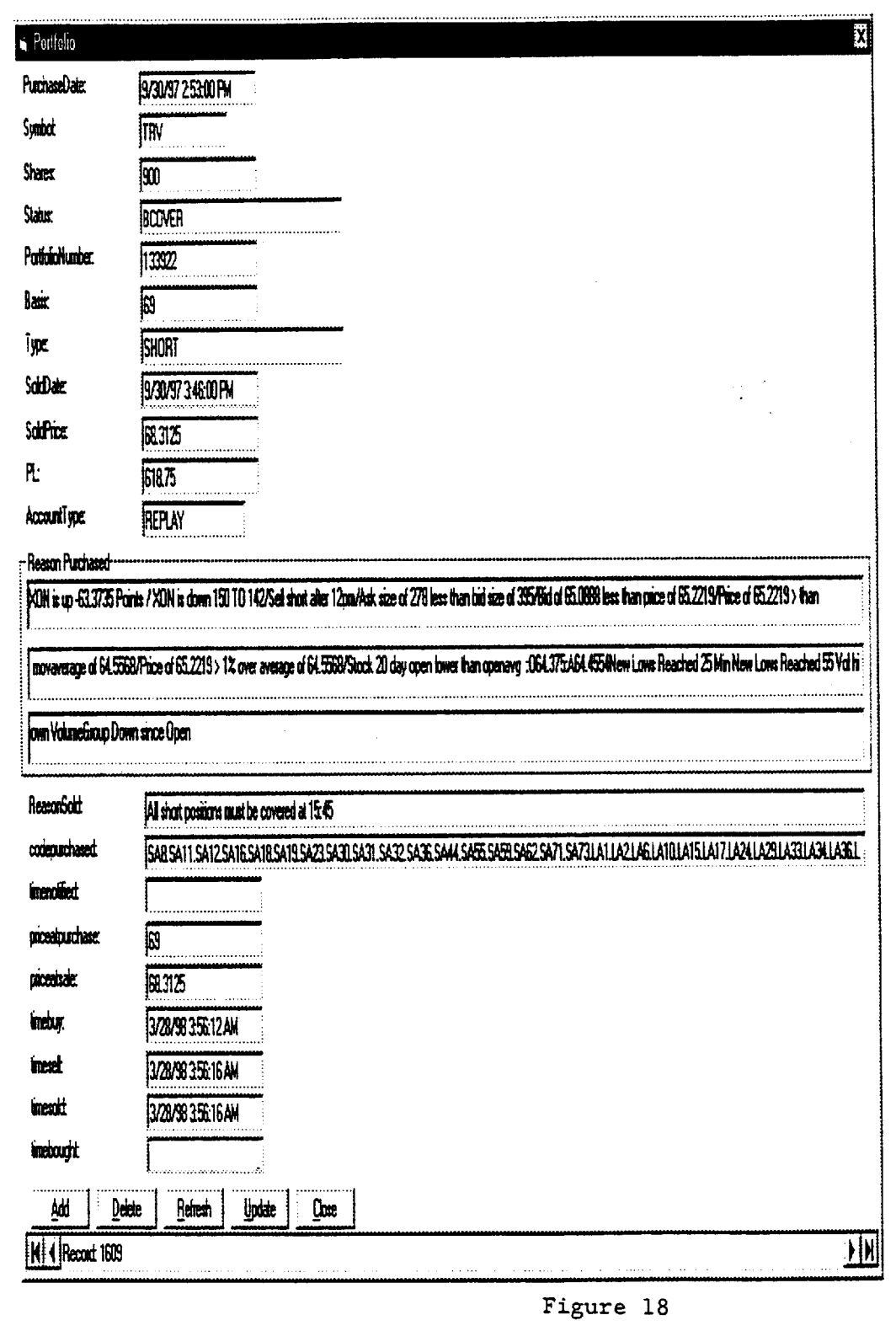
Figure 19:
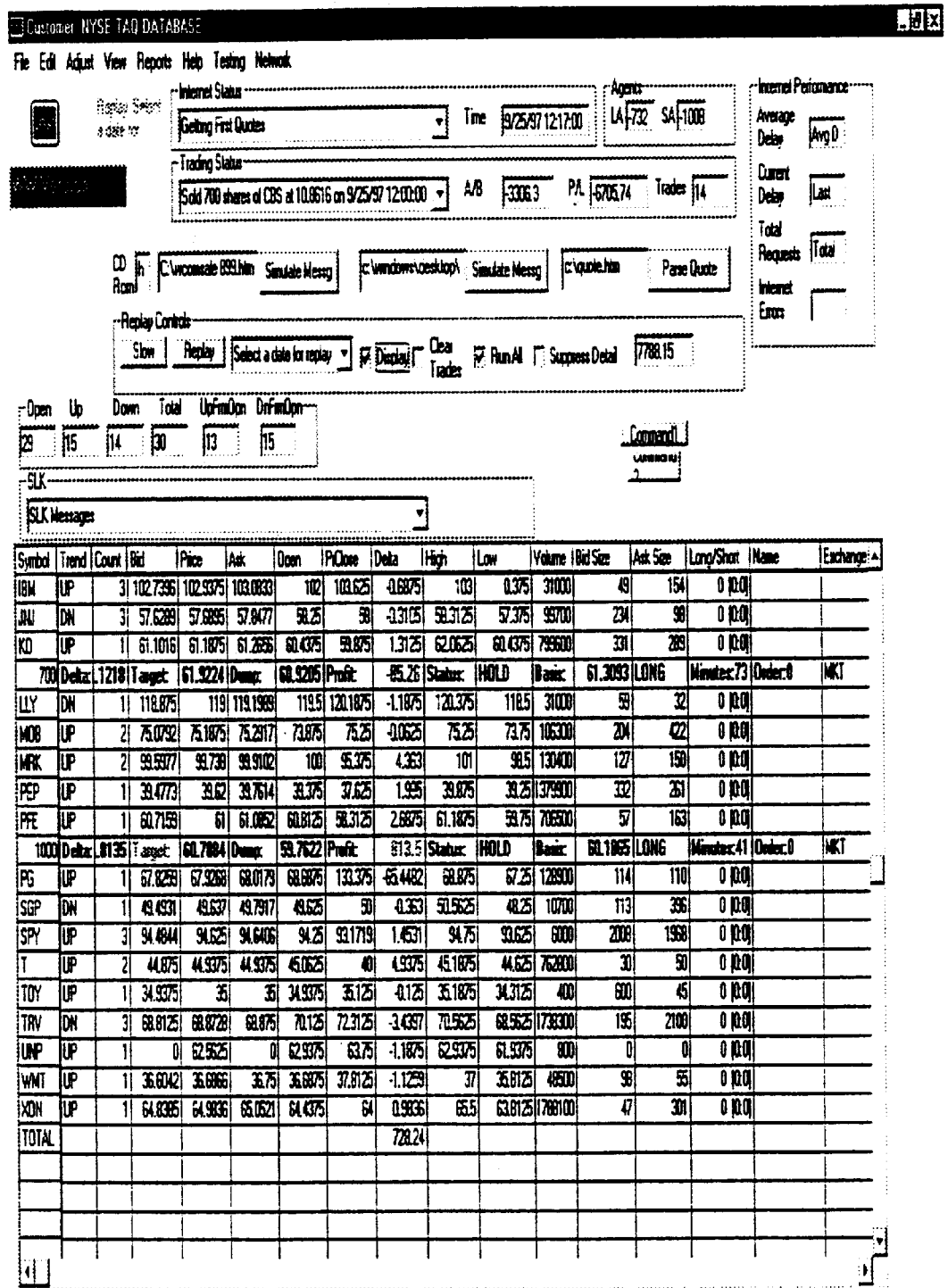
FIG. 19 shows sample form executions, similar to FIG. 18, but with two trades in progress.

FIG. 19 shows a sample forms/executions, similar to FIG. 18, but with two trades in progress. 700 shares of KO are held LONG for 73 minutes, while 1000 shares of PFE are held long for 41 minutes. The unrealized profit in the portfolio is #728. The position in KO is slightly adverse but improving, while the position in PFE is $813 positive. Fourteen trades have been conducted with a net of $7788.15. In this run, 29 of the 30 stocks being tracked are open with 15 up from previous close, 14 down from previous, 13 up from open and 15 down from open. The blue highlight on the Minutes:73 tag for KO indicates a pending sale of the security, due to the insufficient movement in the security.

Figure 20:
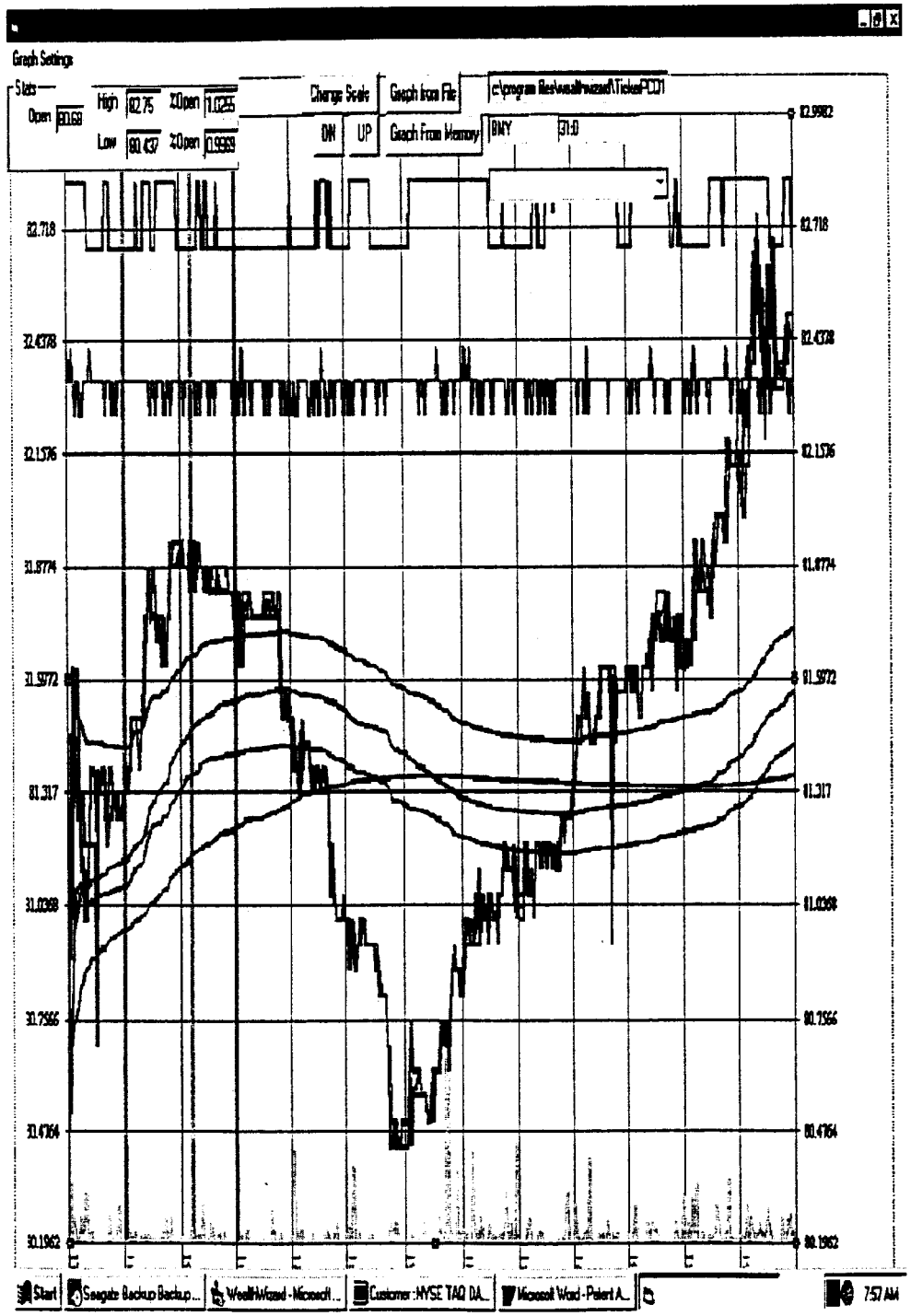
FIG. 20 shows ample graph executions continued from FIGS. 18 and 19, visualizing system calculations.

FIG. 20 shows a sample forms/execution to visualize system calculation and to illustrate the 2–3% daily variance of the securities selected by the program to trade in. The vertical lines indicate the first decision points by the program. Note the high of 2.5% over the open price and the low of 0.3% of the open. Each block is a 30 minute portion of time from market open.

FIG. 3 High Level View (1) Intelligent Agents

The 200 intelligent agents currently in the system contain rules and logic which evaluate market and specific equity behaviors. Many of these agents are further controlled by system parameters. When an agent 'fires', the value associated with that agent is added to the long or short 'votes' for the direction the equity will move. Agent values are continually updated by the program as part of the learning process.

(2) Certainty

The system incorporates an additional check, after the intelligent agents have voted, that checks the certainty of the vote for each equity. Essentially the system asks itself, are you certain? This check is unique in that the inventor has found no reference to it in A.I. literature, and it greatly improves the trading accuracy of the system. This check looks at the delta between the long and short agents voting to take a position in the equity to determine the certainty of the A.I. engine as to the direction the equity will move (or continue to move).

(3) Voting

All equities that pass the certainty check and other checks (enough dollars to buy a minimum number of shares, etc, etc.) are then compared to each other, and the position with the highest total delta between long and short votes is selected.

(4) Take a Position

Wealth Wizard™ places the order with the broker or specialist through either internet or direct connection, and waits for the confirmation from the broker. If the order is not filled in a parameter set number of minutes, the system cancels the order. The order may be placed as a market or limit, long or short order, depending on the system's votes and settings.

FIG. 4: WealthBuilder Process Flows

WealthBuilder encompasses multiple information flows over multiple communications technologies. These can be broken into the following categories.

Trade Execution

WealthBuilder has a flexible broker interface layer which supports multiple protocols to reach brokers and specialists. The major execution functions are:

1. Quote Info
2. Trade Requests
3. Trade Confirms
4. Account Information
5. Portfolio Information
6. Logon/Security
7. Encryption
8. Auditing/Balancing HTML over Internet WealthBuilder communicates over the internet to command internet brokers to execute trades and to retrieve results. It is the first application to do so. It mechanically decrypts the Secure Socket Layer internet protocol, reads the web pages of the brokers, issues commands to the brokers, and retrieves trade and account information from the brokers. An example of this is the program's ability to command trades against E*trade. Beginning in early 1997 we executed thousands of fully automated trades, against E*trade.

Dedicated or Wide Area Network

WealthBuilder can be plugged directly into a broker's or specialist's wide area network (WAN) or hooked directly via dedicated lines to command trades and retrieve brokerage information.

WealthBuilder timestamps both the execution time and the current trading range for each order, so that disputes can be automatically generated, filed and supported. The trading range at the time of trade is automatically compared to the fill price to generate disputes.

Market Information

WealthBuilder receives real time quote and trade information which it processes in real time over several distributed computers. This information may be received via satellite, radio transmission, direct lines, or internet links.

Customer Information/Interaction

WealthBuilder provides multiple methods of feedback to account holders, fund managers, etc. These include alpha-numeric pager/cell phone messages regarding trade execution, computer telephony server allowing telephone reporting of trade and account information, fax broadcast, email broadcast, and internet. WealthBuilder also provides a real time internet client allowing users to monitor trade execution and position values held so that a customer can feel connected to the trading environment. The computer makes the decisions but can be monitored remotely. WealthBuilder also allows customer override and entry of trading commands, and provides a single screen for quote and position information.

FIG. 5 Learning from Success for Long Orders

Please reference sections 7 and 8 from the High Level View

"Once a position is exited, the position is categorized as a win or a loss, and the agents that voted for the position are either rewarded or punished, while the agents that voted against the position are also rewarded or punished. Each agent's track record for each equity is recorded. If the agent is consistently wrong, the agent becomes a double agent, voting long if it is a short agent or short if it is a long agent. The system monitors the success rate and failure rate of each agent and grants each a cumulative merit quotient according to the cumulative rate of success and/or failure for the respective agent. This merit quotient controls the power the agent wields in subsequent voting. It should be noted that agents that only fire occasionally but that are highly accurate carry more weight than agents that fire many times but are less accurate."

FIG. 5 shows the detail of how agents are rewarded for a successful long order.

If the learnmode is engaged, and the order is a long order, and the order was successful, then this code is executed.

Any long agent that voted long for this order is rewarded. From the chart: "Reward this agent, it voted to buy long when long made money"

Any short agent that voted against this long order is punished. From the chart: "Punish this agent, it voted to buy short when long made money."

A very important and unique concept in this system is that agents that are consistently wrong are punished so often that they become double agents, voting for the other side. In this case, a short agent that continually votes against a long trade for a certain stock in a certain market condition ends up with a negative value, such that when it votes to buy short, its negative value detracts from the total vote to buy short, thereby actually making a long order more likely.

A second concept is that inaccurate agents are quickly marginalized. Their accuracy levels drop so low that they disappear into background noise.

FIG. 6 Learning from Success for Short Orders

Please reference sections 7 and 8 from the High Level View.

FIG. 6 shows the detail of how agents are rewarded for a successful short order.

If the learnmode is engaged, and the order is a short order, and the order was successful, then this code is executed.

Any short agent that voted short for this order is rewarded. From the chart: "Reward this agent, it voted to buy short when short made money.

Any long agent that voted against this short order is punished. From the chart: "Punish this agent, it voted to buy long when short made money."

This is essentially the mirror image of FIG. 5.

FIG. 7 A.I. Evaluation Criteria

Please reference section 3 from the High Level View.

"All equities that pass the certainty check and other checks (enough dollars to buy a minimum number of shares, etc, etc.) are then compared to each other, and the position with the highest total delta between long and short votes is selected."

FIG. 7 depicts the artificial intelligence voting that occurs to select a position.

Quote and trade data is continually summarized and stored in memory in real time. The information is then evaluated by each of the long and short agents. (Hundreds of agents evaluate potentially thousands of securities in the space of seconds. This involves hundreds of thousands of high level calculations, corresponding to hundreds of millions of instructions of lower level computer code . . . all executing once every 45 seconds).

FIG. 8 Intelligent Agents: Evaluate

Please reference section 3 from the High Level View.

All equities that pass the certainty check and other checks (enough dollars to buy a minimum number of shares, etc, etc.) are then compared to each other, and the position with the highest total delta between long and short votes is selected.

Each security is evaluated prior to voting. The criteria include a check on the "directional tendency" of the stock. The number of UP or DN periods (excluding NC periods) are added together and checked against the waittick system parm. The system also ensures that there is a valid open price for the security, and, finally, if there are enough funds on hand to buy at least the minimum number of shares (minshares system parm). If a security fails these checks, it is kicked out for this evaluation period (typically once a minute).

Each long and short agent then votes. Its vote is tallied with the weight of the agent. If the agent's weight is negative, it votes as a double agent. (if it is a short agent, the vote counts towards a long purchase . . . if it is a long agent, the vote counts towards a short purchase). The agent's vote is also recorded in the trade record for learning and analysis.

This process is repeated for each security, for each agent.

FIG. 9 Hold/Sell Decision

Please reference section 5 from the High Level View. "Wealth Wizard™ manages the portfolio in real time to optimize profit or cut loss. The primary reasons to drop a position are:

| | |
|---|---|
| The target is met and the stock is now reversing | (considered a win) |
| The position has done poorly and reached a dump (cut loss) point | (considered a loss) |
| The position has not moved significantly after a system determined amount of minutes | (considered a push) |
| The target is not met but the stock is reversing from its best price | (win or loss depending on sale price) |
| The end of the trading period is reached (day or multi-day) | (win or loss depending on sale price) |

The classification of a position as win or loss (good decision or bad decision) is important in the learning process.

The trading system monitors a portfolio of securities in real time, executing buy, sell, sell short and buy to cover trades automatically. The system cuts losses on adverse positions while riding gains on positive positions. The system is targeted to intra-day trading, a method of trading well suited to computer automation. A combination of real time monitoring of a portfolio of stocks and no holding of positions overnight (trading flat) can shield an investor from loss while maximizing gain. The system performs the kind of careful, tireless monitoring required, giving the user a daily return on his investment while minimizing risk.

Specifically, the system will check if it's time to drop positions based on the dumplongat and dumpshortat parameters. If these are met, then it's close to the end of the day and it's time to drop the positions (if the program is trading flat, exiting positions at the end of the day).

If the price is has not reached the target price (a percentage of the basis sellpcnt parm) and a minprofit has been returned (minprofittimeout) and the timeoutsell parm has been exceeded, then drop the position. The message related to this is that insufficient activity has occurred to continue to hold the position.

If the target price has been reached and there are holdsell number of consecutive adverse ticks (an up movement for a short position or a down movement for a long position) then drop the position and consider this a success for the purpose of learning. If the price has moved the dumppcnt percentage against the position, then drop the position and consider it a loss for the purpose of learning.

If the best price achieved has been reversed by bestpcnt, then drop the position. (e.g. the target is not met but the stock is reversing from its best price).

(5) Manage the Position

Wealth Wizard™ manages the portfolio in real time to optimize profit or cut loss. The primary reasons to drop a position are:

| | |
|---|---|
| The target is met and the stock is now reversing | (considered a win) |
| The position has done poorly and reached a dump (cut loss) point | (considered a loss) |
| The position has not moved significantly after a system determined amount of minutes | (considered a push) |
| The target is not met but the stock is reversing from its best price. | (win or loss depending on sale price) |
| The end of the trading period is reached (day or multi-day) | (win or loss depending on sale price) |

The classification of a position as win or loss (good decision or bad decision) is important in the learning process.

The trading system monitors a portfolio of securities in real time, executing buy, sell, sell short and buy to cover trades automatically. The system cuts losses on adverse positions while riding gains on positive positions. The system is targeted to intra-day trading, a method of trading well suited to computer automation. A combination of real time monitoring of a portfolio of stocks and no holding of positions overnight (trading flat) can shield an investor from loss while maximizing gain. The system performs the kind of careful, tireless monitoring required, giving the user a daily return on his investment while minimizing risk.

(6) Record Trade Data and Account History

When the system wakes up in the morning, it interrogates the brokerage account to obtain available capital, available margin, and other relevant information. The system then proceeds to trade against the account and records the results of the trades including the reasons each position was taken and exited and all relevant tax and economic data. All data is timestamped for later audit. For example the prevailing price at the time of an order and the price the order is filled at are both recorded and timestamped.

(7) Learn from the Profit or Loss of the Position (Updating Agents)

Once a position is exited, the position is categorized as a win or a loss, and the agents that voted for the position are either rewarded or punished, while the agents that voted against the position are also rewarded or punished. Each agent's track record for each equity is recorded. If the agent is consistently wrong, the agent becomes a double agent, voting long if it is a short agent or short if it is a long agent. The system monitors the success rate and failure rate of each agent and grants each a cumulative merit quotient according to the cumulative rate of success and/or failure for the respective agent. This merit quotient controls the power the agent wields in subsequent voting. It should be noted that agents that only fire occasionally but that are highly accurate carry more weight than agents that fire many times but are less accurate.

(8) Carry Forward the Learning

During replays (training runs against historical data), a sequence of days is run many times. If the profit is improved upon during a run, the agent values that were in effect at the time of the run are kept, and the agent knowledge base is updated. During live runs with real trading dollars, the system continually updates itself, thereby adapting to changing market conditions. This is highly unique among trading systems.

(9) Execution

The system communicates in an automated fashion with a broker/specialist to place securities orders over the internet or through direct connection. This functions as an execution system for the decision-making logic. This execution system is unique in its ability to support multiple brokers and all functions of portfolio management. No human intervention is required for the execution.

(9a) Internet

The system supports SSL secure sockets and other internet protocols to mimic the function of a browser accessing an electronic trading site while placing orders, checking the status of orders, and checking the price information on securities being tracked. This is unique in that it enables the automated management of accounts and the placement of transactions with internet brokers.

(9b) Direct

The system supports direct connection via OLE or file transfer, or it can mimic the function of a terminal accessing an electronic trading system while placing orders, checking the status of orders, and checking the price information on securities being tracked. This enables the automated management of accounts held by specialists. The modular nature of this interface for securities trading is unique.

(9c) Notification

The system supports alphanumeric paging to pagers and PCS phones, enabling the remote notification of executed trades, account balances, etc.

FIG. 10 Hold/Self Decision

Please reference section 5 from the High Level View

"Wealth Wizard™ manages the portfolio in real time to optimize profit or cut loss . . . "

Please refer to FIG. 9 above.

This graphic explains the derivation of the dumpshort and dumplong system instructions, and the calculation of target prices. In addition, this section updates the ongoing profit and loss for each portfolio item listed on the unified display.

The program uses multiple algorithms to exit a position, including the bid/ask channel moving away from the basis by X/16ths, the time held without movement or profit, and % retraces from the best price achieved.

FIG. 11 Handling Partial Orders

Please reference sections 6 and 9 from the High Level View

This graphic explains the management of partial orders. Partial fills occur frequently during the order process, and must be consolidated to avoid additional trading costs as positions are liquidated, and must be handled to properly calculate profit and loss. If a position is being held, and it is being held at the same basis price, then the positions are combined, with the number of shares consolidated and the duplicate entry removed. If the positions are at a different basis price, they are managed separately.

FIGS. 12a and 12b Analyze Account Transactions from Portfolio

Please reference sections 6 and 9 from the High Level View

These graphics depict the management and authentication of the current portfolio records. Any security in a pend sell or pend buy cover status (liquidating the position) is compared against a snapshot of the portfolio from the broker, or updated from a trade record. The information is then updated, reducing the number of shares held by the number of shares liquidated. The portfolio trade report is then updated.

FIG. 13 Parsing Trade Message from Broker

Please reference sections 6 and 9 from the High Level View

FIG. 13 depicts the processing of broker initiated messages. Messages are received electronically and parsed via a text parsing process. If the message is not a trade message, it is captured, written to a file and sent to a pager.

If the message is a liquidation message (bought to cover or sold) and it matches a security in the portfolio, then the reported shares are removed from the portfolio, the available trading balance is increased, and the database is updated. The trade message is then written to a file and sent to a pager.

FIG. 14 Timer Loop

This figure depicts the main timer loop (heartbeat) for the Wealth Wizard™ program. The loop is executed once per second (every 1000 milliseconds). If the program is in replay or runsafe mode(s) (simulating trading for training and self-learning purposes, either against live or historical data), then it behaves differently from live mode, where actual trading is occurring.

Live Mode

In the live mode, the program waits until the delay seconds have gone by, typically 45–60 seconds, and then it views the accumulated quotes. Quote and trade data can be configured to arrive in real time via a quote feed, or can be polled against an on-line data source (for example, E*trade).

The quote data is then parsed (continually, in real time). Any messages pending from the broker are checked, and the portfolio is then updated. Once the program has an updated view of its holdings and an updated view of its funds, it evaluates each equity being tracked, and makes buy/sell/sell short/buy to cover decisions. The results are then updated and displayed (both the position and the quote windows), and the timer loop repeats.

Replay/Run Safe Modes

This mode is very similar with two additional functions. Quote/Trade data may be pulled from historical tick or quote data (replay mode) or from a live source (run safe mode). For both modes, since the system is not actually trading, the system simulates order completions as if the orders were being filled with a live broker. This enables the learning process against historical data, and allows trading against a live feed without putting any funds at risk.

FIG. 15 Program Startup

This graphic depicts the program's startup routines. These are generally executed once each morning at the start of the trading day. First the program loads its system parameters and its learning weights (the weights are continually updated each day as trading experience is gained . . . here we grab the last updated events). The program then determines the mode it is operating in. This is the only required input from the human operator, and even this may be automated for non-attended startup.

If we are running live, the program performs an internet or direct fetch, communicating with the broker to pull current portfolio records and current account balances from the broker, and validating those against internal records. The available margin is also calculated for use.

Stock selection then takes place. This can be from a table which is user maintained, or can be rebuilt each night from an on-line stock database. For example, the system might select the highest volume stocks in yesterday's market, or the most widely held stocks, or stocks that are near their 52 week high, etc., etc., etc..

The system can pull trade rules and data from our web site, as well as identify the following:
    Gainers/Losers
    Volume Alerts
    High/Low Alerts
    Most Active The ability to download trading rules and system settings allows for the remote update of trading rules and settings on a service bureau basis. This continual (daily) update would be provided on a subscription basis.

FIG. 16 Learn from failure: Long Order

Please reference sections 7 and 8 from the High Level View

"Once a position is exited, the position is categorized as a win or a loss, and the agents that voted for the position are either rewarded or punished, while the agents that voted against the position are also rewarded or punished. Each agent's track record for each equity is recorded. If the agent is consistently wrong, the agent becomes a double agent, voting long if it is a short agent or short if it is a long agent. The system monitors the success rate and failure rate of each agent and grants each a cumulative merit quotient according to the cumulative rate of success and/or failure for the respective agent. This merit quotient controls the power the agent wields in subsequent voting. It should be noted that agents that only fire occasionally but that are highly accurate carry more weight than agents that fire many times but are less accurate."

FIG. 16 shows the detail of how agents are punished for an unsuccessful long order.

If the learnmode is engaged, and the order is a long order, and the order was unsuccessful, then this code is executed.

Any long agent that voted long for this order is punished.

Any short agent that voted against this long order is rewarded.

A very important and unique concept in this system is that agents that are consistently wrong are punished so often that they become double agents, voting for the other side.

FIG. 17 Learn from failure: Short Order

Please reference sections 7 and 8 from the High Level View.

"Once a position is exited, the position is categorized as a win or a loss, and the agents that voted for the position are either rewarded or punished, while the agents that voted against the position are also rewarded or punished. Each agent's track record for each equity is recorded. If the agent is consistently wrong, the agent becomes a double agent, voting long if it is a short agent or short if it is a long agent. The system monitors the success rate and failure rate of each agent and grants each a cumulative merit quotient according to the cumulative rate of success and/or failure for the respective agent. This merit quotient controls the power the agent wields in subsequent voting. It should be noted that agents that only fire occasionally but that are highly accurate carry more weight than agents that fire many times but are less accurate."

FIG. 17 shows the detail of how agents are punished for an unsuccessful long order.

If the learnmode is engaged, and the order is a short order, and the order was unsuccessful, then this code is executed.

Any long agent that voted long for this order is rewarded.

Any short agent that voted against this long order is punished.

A very important and unique concept in this system is that agents that are consistently wrong are punished so often that they become double agents, voting for the other side.

FIG. 18 Trade Records

This trade record shows a sample trade on the system. The reason for purchase, reason for sale, direction of purchase (long/short), timestamp, quotestamp, and P/L are recorded for each trade.

FIG. 19 Main Form—Trading Status

This main form shows two trades in progress. From the main form, the computers positions and decisions may be tracked, and manual trades may be commanded. One click on either the symbol or the shares held field initiates a buy or sell.

FIG. 20 System Graph

This system graph is used to visualize select system calculations and to illustrate the 2–3% daily variance of the securities selected by the program to trade in. The vertical lines indicate the first decision points by the program. Note the high of 2.5% over the open price and the low of 0.3% of the open on the graph depicted. Each block is a 30 minute portion of time from market open.

Figure 21:
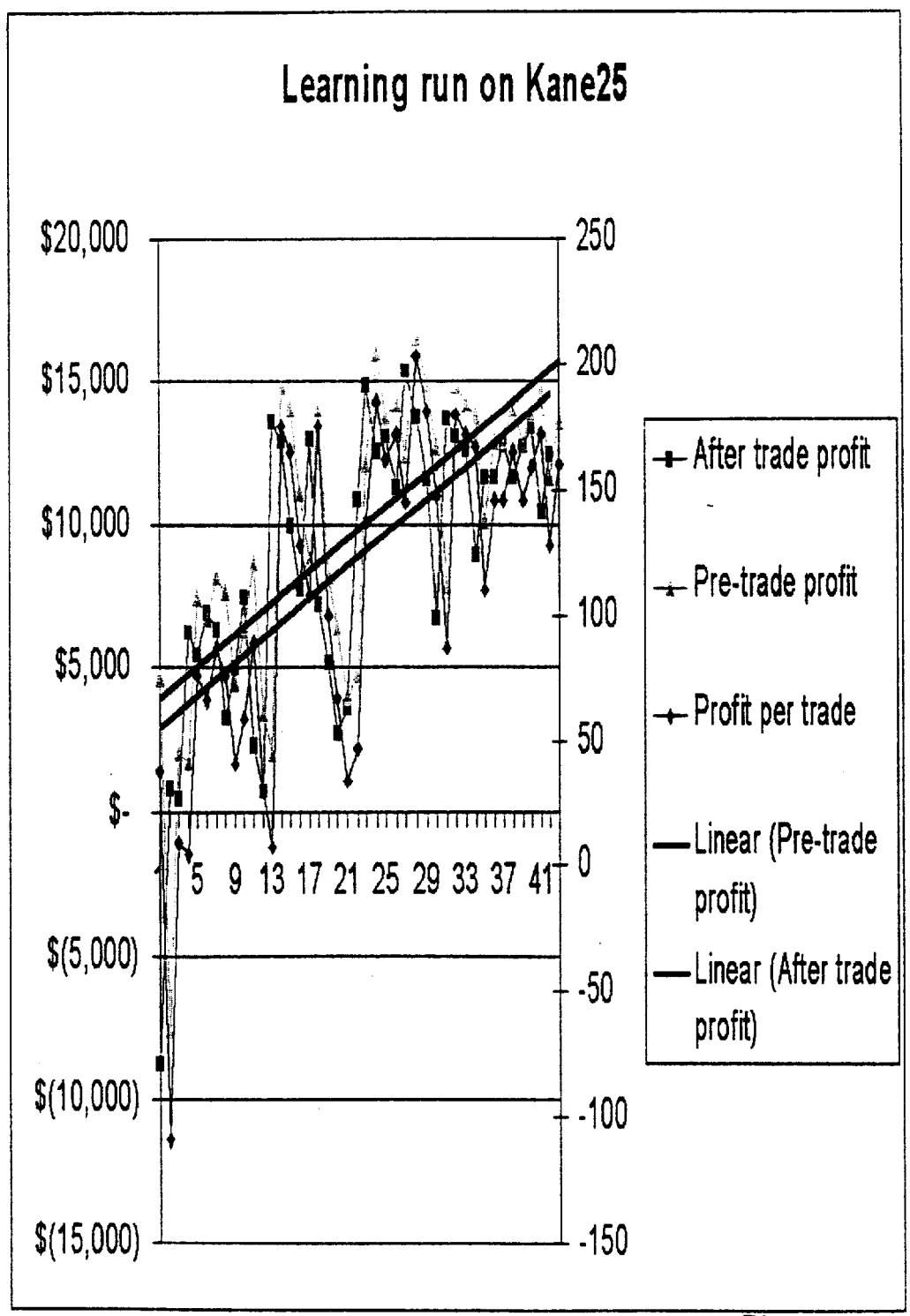
FIG. 21 shows in graph form continual improvement via the system's self-learning feature

FIG. 21 Continual Improvement via Self-Learning

FIG. 21 illustrates how the self learning works. Pictured are 41 successive runs against 10 days in September, using $100,000 in capital, and monitoring the 25 most widely held NYSE equities. Note that the system initially takes losses, but after successive runs the system learns which rules are effective with which stocks in which market conditions and steadily improves. Note the variances as the system evolves its agent settings, yet over time the knowledge base improves, and the profit approaches $15,000 or 15%, with the profit approaching $200 per-trade. What is unique about this approach is that the system is continually able to re-invent and adjust itself to adapt to changing market conditions and the characteristics of individual securities without the need for human intervention.

FIG. 22 Sample Trades

These sample trades, on an average trading day, show the trading pattern of the system.

The invention is a mechanized, fully automated securities trading system that incorporates decision making, execution and learning capabilities. The system engages in automated decision making to acquire and sell securities positions via processing logic. The securities trading system provides a number of long and short Intelligent agents. The decision making includes the voting of Intelligent agents Currently there are 160 agents (80 long, 80 short). The acquisition and disposal of positions is completely automated, with no human intervention required or desired. This is a unique aspect of the system. A feedback arrangement monitors the success and failure of the agents and rewards/punishes the agents, thereby enabling the program to learn. This improves the system performance based on past and current experience, and enables the system to continually self adapt. The system is continually able to invent and adjust itself to adapt to changing market conditions and the trading/trending characteristics of individual securities. Other agents loop back on the agents themselves, looking for groups of agents that are more accurate taken in combination—this performs a similar function to but is much faster than a neural net. Additional enhancements improve and speed the learning capabilities of the system. LeMarck, Darwin and RV are learning modes designed to leverage and circumvent the strengths and limits of self learning A.I. Systems. Of particular importance and uniqueness is the speed in which this selfwearing artificial intelligence is Implemented . . . the system is fast enough to make decisions In real time, procesing trade by trade data from entire markets. Mechanically, the system utilizes multiple computers networked together over a local area network using a high speed messaging protocol custom designed for this application, which is able to distribute the workload of decision making, position monitoring and self-learning (1) Intelligent Agents The 160 intelligent agents currently In the system contain rules and logic which evaluate market and specific equity behaviors. Many of these agents are further controlled by system parameters. When an agent 'fires', the value associated with at agent is added to the long or short 'votes' for the direction the equity will move. Agent values are continually updated by the program as part of the learning process.

(2) Certainty

The system Incorporates an additional check the inventor has after the intelligent agents have voted, that checks the certainty of the vote for each equity. Essentially the system asks itself, are you certain? This check is unique in that the inventor has found no reference to it in. A.I. literature, and it greatly improves the trading accuracy of the system. This check looks at the delta between the long and short agents voting to take a position in the equity to determine the certainty of the A.I. engine as to the direction the equity will move (or continue to move).

(3) Voting

All equities that pass the certainty check and other checks (enough dollars to buy a minimum number of shares, etc, etc.) are then compared to each other, and the position with the highest total deta between long and short votes is selected.

(4) Take a Position

Wealth Wizard™ places the order with the broker or specialist through either Internet or direct connection, and waits for the confirmation from the broker. If the order is not filled In a parameter set number of minutes, the system cancels the order. The order may be paced as a market or limit, long or short order, depending on the system's votes and settings.

(5) Manage the Position

Wealth Wizard® manages the portfolio in real time to optimize profit or cut loss. The primary reasons to drop a position are:

| | |
|---|---|
| The target is met and the stock is now reversing | (considered a win) |
| The position has done poorly and reached a dump (cut loss) point | (considered a loss) |
| The position has not moved significantly after a system determined amount of minutes | (considered a push) |
| The target is not met but the stock is reversing from its best price. | (win or loss depending on sale price) |
| The end of the trading period is reached (day or multi-day) | (win or loss depending on sale price) |

The classification of a position as win or loss (good decision or bad decision) is important in the learning process.

The trading system monitors a portfolio of securities in real time, executing buy, sell, sell short and buy to cover trades automatically. The system cuts losses on adverse positions while riding gains on positive positions. The system is targeted to intra-day trading, a method of trading well suited to computer automation. A combination of real time monitoring of a portfolio of stocks and no holding of positions overnight (trading flat) can shield an investor from loss while maximizing gain. The system performs the kind of careful, tireless monitoring required, giving the user a daily return on this investment while minimizing risk.

(6) Record Trade Data and Account History

When the system wakes up in the morning, it interrogates the brokerage account to obtain available capital, available margin, and other relevant information. The system then proceeds to trade against the account, and records the results of the trades including the reasons each position was taken and exited, and all relevant tax and economic data. All data is timestamped for later audit. For example the prevailing price at the time of an order and the price the order is filled at are both recorded and timestamped.

(7) Learn from the Profit or Loss of the Position (Updating Agents)

Once a position is exited, the position is categorized as a win or a loss, and the agents that voted for the position are either rewarded or punished, while the agents that voted against the position are also rewarded or punished. Each agent's track record for each equity is recorded. If the agent is consistently wrong, the agent becomes a double agent, voting long if it is a short agent or short if it is a long agent. The system monitors the success rate and failure rate of each agent and grants each a cumulative merit quotient according to the cumulative rate of success and/or failure for the respective agent. This merit quotient controls the power the agent wields in subsequent voting. It should be noted that agents that only fire occasionally but that are highly accurate carry more weight than agents that fire many times but are less accurate.

Self-Learning

The system must select which securityles to purchase and which direction (long or short) to purchase against. Merit points are awarded to each agent that issued an order for a successful trade, and merit points are taken away from each agent that voted for a failed trade. Agents that are consistently wrong are punished to such an extent that they become double agents, voting for the 'other side'. The addition of double agents is unique to this feedback system.

The system may be trained from stored historical trade data and will continually adjust itself from live data. When executing against historical data, a replay function is utilized. This function can after the system operating parameters, In addition to training the agents. Three super agents, named Darwin, LeMark and ReplayVariant enhance the replay function. Data Source for trade and quote data include live trade feeds, stored trade data from these feed the capturing of internet stock quote data, and the NYSE TAQ Database.

LeMarck

Rewards and punishes agents that voted for and against winning and losing trades. Keeps the updated agent settings if they produce a superior result as compared to all prior runs. Named for the scientist who proposed that offspring inherit the learned behaviors of their parents.

Darwin

Randomly changes agent settings, executes a,replay, and keeps the altered settings if they produce a superior result as compared to prior runs. Darwin is parcularly useful in breaking through dead ends or plateaus that LeMarck encounters. Named for the scientist who proposed natural selection.

Darwin is further controlled by the mutationrate and mutationsize parameters. The mutation rate governs the number of agents subject to mutation in each generation. The mutation size governs the magnitude of the possible mutations. The individual agents selected and the magnitudes of their mutations (within the mutation size guidelines) are randomly generated.

Replay Variant (RV)

Alters any of the system parameters so that successive runs can be made with differing parameter settings, allowing the optimization of these settings. For example, the number of minutes to hold a stagnant position or the maximum tolerable loss of a position are parameters that can be altered.

(8) Carry Forward the Learning

During replays (training runs against historical data), a sequence of days is run many times. If the profit is Improved upon during a run, the agent values that were In effect at the time of the run are kept, and the agent knowledge base is updated. During live runs with real trading dollars, the system continually updates itself, thereby adapting to changing market conditions. This is highly unique among trading systems.

(9) Execution

The system communicates in an automated fashion with a broker/specialist to place securities orders over the internet or through direct connection. This functions as an execution system for the decision-making logic. This execution system is unique in its ability to support multiple brokers and all functions of portfolio management. No human Intervention is required for the execution.

(9a) Internet

The system supports SSL secure sockets and other Internet protocols to mimic the function of a browser accessing an electronic trading site while placing orders, checking the status of orders, and checking the price information on securities being tracked. This is unique in that it enables the automated management of accounts and the placement of transactions with internet brokers.

(9b) Direct.

The system supports direct connection via OLE or file transfer, or it can mimic the function of a terminal accessing an electronic trading system while placing orders, checking the status of orders, and checking the price information on securities being tracked. This enables the automated management of accounts held by specialists. The modular nature of this interface for securities trading is unique.

(9c) Notification

The system supports alphanumeric paging to pagers and PCS phones, enabling the remote notification of executed trades, account balances, etc.

Generalized System Operation/Description

The system attempts to increase assets by leveraging daily fluctuations In securities. Generally, stock prices fluctuate 1%–3% each day, and by leveraging these fluctuations an individual may realize a return on investment.

The following is needed to utilize the invention: software as disclosed herein, a PC running an operating system such as Windows® 95 or NT or the like, a high speed internet connection, and a brokerage account.

The Invention operates as follows: On a typical trading day, a stock may take a small dip at approximately 9:35 am, reach its high at 11:30 am, and decline until 3 pm, perhaps with a small run up at the dose of the day. The system buys a stock at the morning dip and sells it at the midmorning high. It then sells the stock short and buys to cover at the lower afternoon price. An investor makes money on the way up and more on the way down. If possible, the system will end the day without holding any stock, but it if does hold a stock overnight, it will be held in a short position. It is far more likely that a stock will go down significantly overnight and retain that drop than go up significantly in value and retain that increase. (Bad news is remembered longer than good) Holding a long position overnight is much more risky. Using the system, it is safe to invest even. If the market is over-valued and headed for a correction. The system can help limit the risks. The system also differentiates between trading and trending (breakout) conditions, and will then buy and sell with the momentum of the security instead of against it.

By monitoring an investor's stock and observing trends continuously during the day, the system limits losses by dumping the stock should things go awry, while maximizing profits by riding out the trends. It is difficult for a person to constantly monitor a stock ticker during the day. A lapse in attention can be costly. Getting caught up emotionally may result in poor decisions. The system does not get tired, does not panic, and does not get greedy.

More importantly, brokerage firms do not let investors place sell and stop orders on the same shares. An investor can either try to profit with sell orders or to protect himself with stop loss orders, but he cannot do both. The system effectively lets investors do both by monitoring stocks continuously.

The system enables a person to make money automatically. It performs the tedious work of monitoring the market. The system is capable of sending alphanumeric trade reports to a user via cellular phone or pager.

The use of margin can increase earning power. Margin may allow investors to realize a larger return each month. However, margin costs money. It is a loan against current stock holdings, allowing an investor to purchase more stock. If the stock is held for days, weeks or months, the investor pays margin interest even if the stock price declines. By day trading, the investor incurs a fraction of the margin cost or none at all, since he Is borrowing and returning the funds on the same day.

The system also allows investors to set buy, sell, and dump prices for stocks that they choose to hold. The system executes automated transactions, sends the investor pager notifications, and permits the investor to view continuously updated prices.

The system provides an extract file of trades, importable to popular tax programs, to help Investors prepare their tax returns. This reporting feature can save the time at tax time.

I claim:

1. A securities trading system comprising:

a data acquisition system having an input communicating with a securities exchange for receiving securities buy/sell data;

a clock for generating clock times;

a processing logic having inputs respectively communicating with said data acquisition system and with said clock for assigning respective clock times to said buy/sell data; and a decision logic having a repository for storing a set of buy/sell rules for buying and selling securities in response to said buy and sell data combined with said clock times;

a current assets memory;

a buy and sell execution system having an input communication with said decision logic for executing buy and sell orders in conformance with said buy/sell rules, wherein said decision logic includes at least one agent being responsive to one of said buy/sell rules, said agent being operative for generating a buy/sell order in response to said buy/sell data conforming to said buy/sell rule, and a feed-back connection from said current assets memory to each of said agents for conveying a cumulative number of merits to a respective agent having issued a sell order for a successful trade.

2. A securities trading system according to claim 1, wherein said decision logic includes at least one decision agent, said agent representing a respective buy/sell rule.

3. A securities trading system according to claim 2, wherein said decision logic includes at least two decision agents, each decision agent representing a respective buy rule and a respective sell rule.

4. A securities trading system according to claim 3, wherein said sell rule is a short sell rule, and said buy rule is a long buy rule.

5. A securities trading system according to claim 1, comprising a plurality of said agents, each agent being responsive to a dedicated one of said buy/sell rules.

6. A securities trading system according to claim 5, each of said agents having a respective input for commonly receiving said buy/sell orders.

7. A method for trading securities with a securities exchange commission, the method including a data acquisition system having an input communicating with at least one securities exchange for receiving buy/sell data; a clock for generating clock times; a processing logic having inputs respectively communicating with said data acquisition system and with said clock for assigning respective clock times to the buy/sell data; a decision logic including a repository for storing a plurality of buy/sell rules for buying and selling securities in response to the buy/sell data; said decision logic having a plurality of agents, each assigned a respective buy/sell rule for generating buy/sell orders for securities in conformance with said buy/sell data; said agents having outputs communicating with said securities exchange for executing said buy/sell orders; the method comprising the steps of:

(a) issuing to all agents a tentative buy short/sell long order for a given security;

(b) soliciting from all agents a tentative buy short decision of a given security;

(c) affirming with the decision logic the buy short decision if a majority of the agents have indicated an affirmative buy short decision; and (d) executing with an executing logic the affirmed buy short order including;

(a) monitoring for a given length of time the security bought on the buy short order;

(b) issuing, when the security has accrued value sufficiently to at least cover to short buy plus a given profit, a buy long order for the security; and monitoring for another given length of time with the decision logic the rates of success and failure of each agent and feeding back to each agent a cumulative merit quotient increment according to the cumulative rate of success and/or failure for the respective agent.

8. A method for trading securities with a securities exchange, the method including a data acquisition system having an input communicating with at least one securities exchange for receiving buy/sell data; a clock for generating clock times; a processing logic having inputs respectively communicating with said data acquisition system and with said clock for assigning respective clock times to the buy/sell data; a decision logic including a repository for storing a plurality of buy/sell rules for buying and selling securities in response to the buy/sell data; said decision logic having a plurality of agents, each assigned a respective buy/sell rule for generating buy/sell orders for securities in conformance with said buy/sell data; said agents having outputs communicating with said securities exchange for executing said buy/sell orders; the method comprising the steps of:

(a) issuing to all agents a tentative buy short/sell long order for a given security;

(b) soliciting from all agents a tentative buy short decision of a given security;

(c) affirming with the decision logic the buy short decision if a majority of the agents have indicated an affirmative buy short decision;

(d) executing with an executing logic the affirmed buy short order; and having artificial intelligence based on a feedback system wherein, after executed transactions the agents are given added or reduced voting power in accordance with the respective success or failure of said transactions based on recommendations of the respective agents.

9. Method according to claim 8, including setting the given length of time to end before the trading day of the buy short order.

* * * * *